US009059923B2

(12) United States Patent
Abraham et al.

(10) Patent No.: US 9,059,923 B2
(45) Date of Patent: Jun. 16, 2015

(54) DEVICES AND METHODS FOR BEACON COMMUNICATION IN AD-HOC NETWORKS

(71) Applicant: Qualcomm Incorporated, San Diego, CA (US)

(72) Inventors: Santosh Paul Abraham, San Diego, CA (US); George Cherian, San Diego, CA (US); Simone Merlin, San Diego, CA (US); Hemanth Sampath, San Diego, CA (US)

(*) Notice: Subject to any disclaimer, the term of this patent is extended or adjusted under 35 U.S.C. 154(b) by 73 days.

(21) Appl. No.: 13/789,479

(22) Filed: Mar. 7, 2013

(65) Prior Publication Data

US 2013/0265906 A1    Oct. 10, 2013

Related U.S. Application Data

(60) Provisional application No. 61/621,304, filed on Apr. 6, 2012, provisional application No. 61/637,670, filed on Apr. 24, 2012, provisional application No. 61/647,993, filed on May 16, 2012, provisional application No. 61/656,693, filed on Jun. 7, 2012.

(51) Int. Cl.
| | |
|---|---|
| *H04L 12/28* | (2006.01) |
| *H04L 12/24* | (2006.01) |
| *H04W 84/18* | (2009.01) |
| *H04W 40/24* | (2009.01) |
| *H04W 40/32* | (2009.01) |

(52) U.S. Cl.
CPC .............. *H04L 41/12* (2013.01); *H04W 84/18* (2013.01); *H04W 40/246* (2013.01); *H04W 40/32* (2013.01)

(58) Field of Classification Search
CPC ... H04W 40/246; H04W 84/18; H04W 40/32; H04L 41/12

USPC .......................................................... 370/254
See application file for complete search history.

(56) References Cited

U.S. PATENT DOCUMENTS

| | | | |
|---|---|---|---|
| 6,842,460 B1 | 1/2005 | Olkkonen et al. |
| 7,200,149 B1 | 4/2007 | Hasty, Jr. |
| 7,809,835 B2 | 10/2010 | Reunamaki et al. |

(Continued)

FOREIGN PATENT DOCUMENTS

| | | |
|---|---|---|
| EP | 1748597 A1 | 1/2007 |
| EP | 2104392 A2 | 9/2009 |
| EP | 2157739 A1 | 2/2010 |

OTHER PUBLICATIONS

International Search Report and Written Opinion—PCT/US2013/034673—ISA/EPO—Jun. 21, 2013.

(Continued)

*Primary Examiner* — Sai-Ming Chan
(74) *Attorney, Agent, or Firm* — S. Hossain Beladi

(57) ABSTRACT

A method includes receiving discovery messages from respective devices of an ad-hoc wireless network. The messages are received by a first device in the ad-hoc wireless network prior to a particular discovery interval. The discovery messages include information identifying the respective devices. The method further includes caching the information identifying the respective devices. During the particular discovery interval, a first discovery message is sent. The first discovery message includes a request to reserve a paging interval during the particular discovery interval. The first discovery message further includes an indication of the information.

28 Claims, 31 Drawing Sheets

(56) References Cited

U.S. PATENT DOCUMENTS

| | | |
|---|---|---|
| 7,856,008 B2 | 12/2010 | Ayyagari et al. |
| 2005/0068934 A1 | 3/2005 | Sakoda |
| 2005/0174950 A1 | 8/2005 | Ayyagari |
| 2005/0250445 A1* | 11/2005 | Hansson ............ 455/41.2 |
| 2009/0016249 A1 | 1/2009 | Li et al. |
| 2009/0017797 A1* | 1/2009 | Li et al. ............ 455/414.1 |
| 2011/0249631 A1 | 10/2011 | Li et al. |
| 2012/0099566 A1 | 4/2012 | Laine et al. |
| 2012/0182932 A1 | 7/2012 | Amis et al. |
| 2012/0191966 A1 | 7/2012 | Jovicic et al. |
| 2013/0155900 A1* | 6/2013 | Sampath et al. ............ 370/254 |
| 2013/0268654 A1 | 10/2013 | Abraham et al. |
| 2014/0185529 A1* | 7/2014 | Lim et al. ............ 370/328 |

OTHER PUBLICATIONS

Shi, "Protocols for impulse radio UWB ad hoc networks", TUDelft, 2010, 195pgs.

Woesner, H., et al., "Power-Saving Mechanisms in Emerging Standards for Wireless Lans:The Mac Level Perspective", IEEE Personal Communications, IEEE Communications Society, US, vol. 5, No. 3, Jun. 1, 1998, pp. 40-48, XP000765374.

* cited by examiner

DEVICES AND METHODS FOR BEACON COMMUNICATION IN AD-HOC NETWORKS

I. CROSS REFERENCE TO RELATED APPLICATIONS

The present application claims priority from U.S. Provisional Patent Application No. 61/621,304, filed Apr. 6, 2012, from U.S. Provisional Patent Application No. 61/637,670, filed Apr. 24, 2012, from U.S. Provisional Patent Application No. 61/647,993, filed May 16, 2012, and from U.S. Provisional Patent Application No. 61/656,693, filed Jun. 7, 2012. Each of the above identified applications is expressly incorporated herein by reference in its entirety.

II. FIELD

The present disclosure is generally related ad-hoc networks and more particularly to devices and methods for communication in ad-hoc networks.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process instructions, such as a web browser application that can be used to access the Internet. Memories, such as a memory within a wireless telephone or other electronic device, may store instructions in addition to other data.

Wireless devices may send and receive data via a packet-forwarding device, such as an access point. The access point may be a "centralized" access point responsible for forwarding packets directly to recipient wireless devices. However, if the centralized access point crashes or otherwise experiences reliability problems, each of the wireless devices may lose wireless communication functionality, frustrating users of the wireless devices. Further, as the number of wireless devices in such a network grows, the centralized access point may become overwhelmed with packets to forward, degrading performance of the network, causing further frustration to the users. Decentralized wireless networks may experience fewer of the problems associated with centralized networks. However, creating and maintaining a decentralized wireless network may be difficult since no single device (such as an access point) controls the network.

IV. SUMMARY

In a particular embodiment, a decentralized network, such an as ad-hoc wireless network, may utilize a discovery message (e.g., a "beacon" that advertises the ad-hoc wireless network to prospective devices) to reserve paging intervals. For example, a paging interval may be reserved during a discovery interval during which the discovery message was sent. Paging messages (e.g., messages related to mobile device applications) may be exchanged during the paging intervals. Because devices in the ad-hoc wireless network are generally awake during at least a portion of the discovery interval, it may be advantageous to indicate to the devices when paging will occur to avoid paging of sleeping devices and to allow devices to sleep without missing pages. In another particular embodiment, a discovery message sent by a device includes information related to multiple devices or indicates that information is available at (e.g., cached by) the device.

In a particular embodiment, a method includes receiving discovery messages from respective devices of an ad-hoc wireless network. The messages are received by a first device in the ad-hoc wireless network prior to a particular discovery interval. The discovery messages include information identifying the respective devices. The method further includes caching the information identifying the respective devices. During the particular discovery interval, a first discovery message is sent. The first discovery message includes a request to reserve a paging interval during the particular discovery interval. The first discovery message further includes an indication of the information.

In another particular embodiment, a method includes sending, prior to a particular discovery interval, a first discovery message by a first device of an ad-hoc wireless network. The first discovery message includes information identifying the first device. During the particular discovery interval, a second discovery message is received from a second device of the ad-hoc wireless network. The second discovery message includes a request to reserve a paging interval during the particular discovery interval. The second discovery message further includes information identifying the first device and further identifying a third device of the ad-hoc wireless network. The method further includes sending, by the first device, a second request for information regarding the third device.

In another particular embodiment, an apparatus includes a processor and a memory. The memory stores instructions that are executable by the processor to cause the processor to receive, prior to a particular discovery interval and by a first device in an ad-hoc wireless network, discovery messages from respective devices of the ad-hoc wireless network. The discovery messages include information identifying the respective devices. The instructions are further executable by the processor to cache the information identifying the respective devices and to send, during the particular discovery interval, a first discovery message that includes a request to reserve a paging interval during the particular discovery interval. The first discovery message further includes an indication of the information.

In another particular embodiment, an apparatus includes a processor and a memory. The memory stores instructions that are executable by the processor to cause the processor to send, prior to a particular discovery interval and by a first device of an ad-hoc wireless network, a first discovery message. The first discovery message includes information identifying the first device. The instructions are further executable by the processor to receive, during the particular discovery interval, a second discovery message from a second device of the ad-hoc wireless network. The second discovery message includes a request to reserve a paging interval during the particular discovery interval. The second discovery message further includes information identifying the first device and further identifying a third device of the ad-hoc wireless network. The instructions are further executable by the processor to send by, the first device, a second request for information regarding the third device.

In another particular embodiment, a non-transitory computer-readable medium stores instructions that are executable by a processor to cause the processor to receive, prior to a particular discovery interval and by a first device in an ad-hoc wireless network, discovery messages from respective devices of the ad-hoc wireless network. The discovery messages include information identifying the respective devices. The instructions are further executable by the processor to cache the information identifying the respective devices and to send, during the particular discovery interval, a first discovery message that includes a request to reserve a paging interval during the particular discovery interval. The first discovery message further includes an indication of the information.

In another particular embodiment, a non-transitory computer-readable medium stores instructions that are executable by a processor to cause the processor to send, prior to a particular discovery interval, send a first discovery message by a first device of an ad-hoc wireless network. The first discovery message includes information identifying the first device. The instructions are further executable by the processor to receive, during the particular discovery interval, a second discovery message from a second device of the ad-hoc wireless network. The second discovery message includes a request to reserve a paging interval during the particular discovery interval. The second discovery message further includes information identifying the first device and further identifying a third device of the ad-hoc wireless network. The instructions are further executable by the processor to send, by the first device, a second request for information regarding the third device.

In another particular embodiment, an apparatus includes means for receiving, prior to a particular discovery interval and by a first device in an ad-hoc wireless network, discovery messages from respective devices of the ad-hoc wireless network and for sending, during the particular discovery interval, a first discovery message. The discovery messages include information identifying the respective devices. The first discovery message includes a request to reserve a paging interval during the particular discovery interval and further includes an indication of the information. The apparatus further includes means for caching the information.

In another particular embodiment, an apparatus includes means for sending, prior to a particular discovery interval, a first discovery message by a first device of an ad-hoc wireless network, for receiving, during the particular discovery interval, a second discovery message from a second device of the ad-hoc wireless network, and for sending a second request. The first discovery message includes information identifying the first device. The second discovery message includes a request to reserve a paging interval during the particular discovery interval and information identifying the first device and further identifying a third device of the ad-hoc wireless network. The second request requests information regarding the third device. The apparatus further includes means for caching the information.

One particular advantage provided by at least one of the disclosed embodiments is that devices not participating in an ad-hoc network may more quickly detect presence of the ad-hoc network. The devices may access the network more quickly, providing users with faster or more reliable operation and assisting other devices in the ad-hoc network. Further, devices more quickly estimate reliability (e.g., an estimated number of hidden nodes) of the ad-hoc network, enabling the devices to quickly determine whether to join the ad-hoc network or to form a new ad-hoc network. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
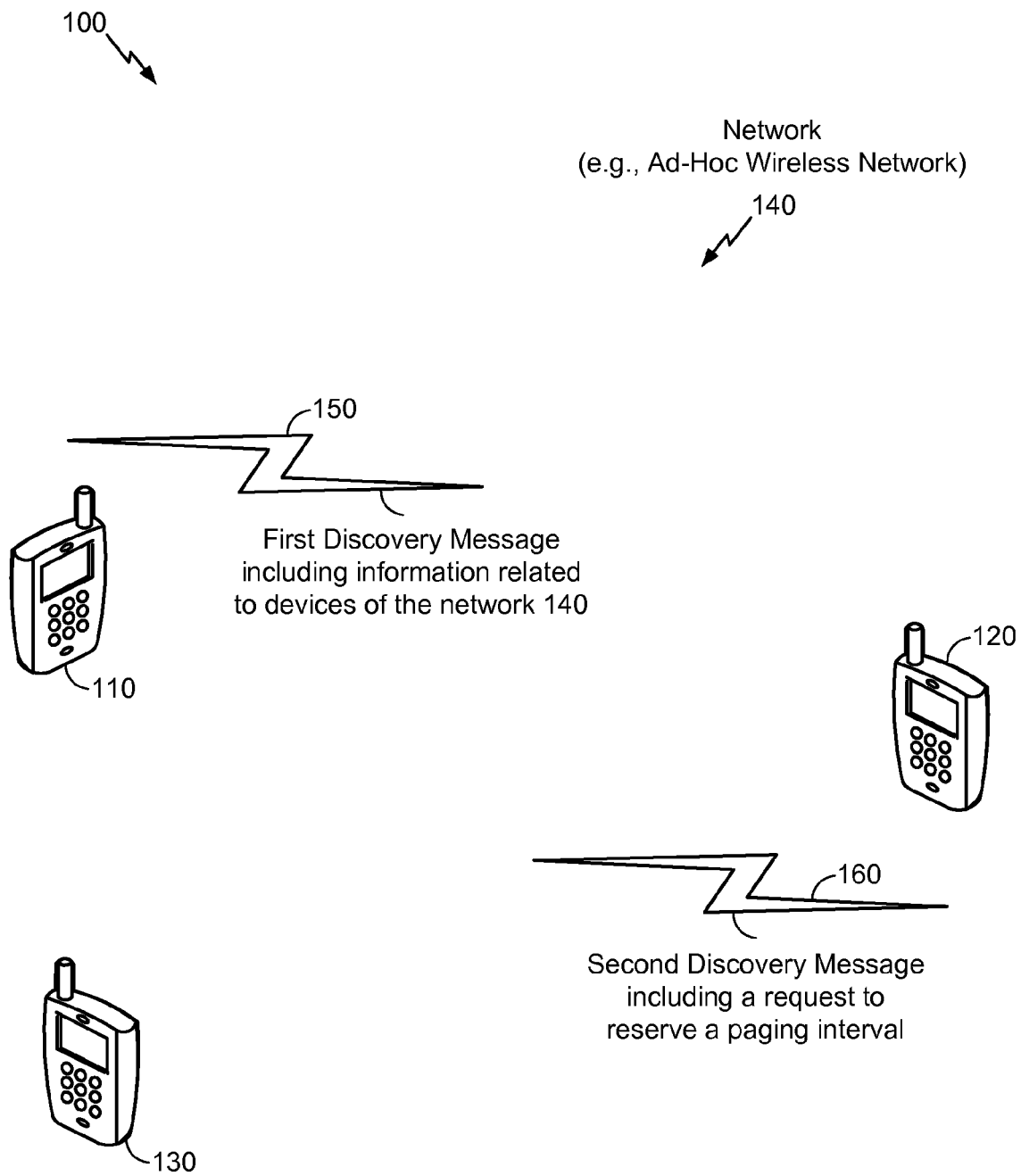
FIG. 1 depicts an illustrative operation of devices within a network.

Referring to FIG. 1, a particular illustrative embodiment of a plurality of devices of a network 140 is disclosed and generally designated 100. As illustrated in the particular example of FIG. 1, the plurality of devices includes a first device 110, a second device 120, and a third device 130, which may be wireless communication devices. The network 140 may be an ad-hoc wireless network in which the devices (e.g., the first device 110, the second device 120, the third device 130, or a combination thereof) may join and leave the network 140 dynamically. In at least one embodiment, each of the plurality of devices joins or leaves the network 140 based in part on discovery messages (e.g., beacons) associated with the network 140, such as a first discovery message 150 and a second discovery message 160, that "advertise" the network 140.

According to a particular illustrative embodiment, the first device 110 may send the first discovery message 150 during a first discovery interval. The first discovery message 150 may include information related to one or more devices of the network 140. For example, the information may identify one or more devices of the network 140, may indicate applications used by one or more devices of the network 140, or may indicate that the first device has cached information related to devices of the network 140.

In response to receiving the first discovery message 150, the second device 120 may send the second discovery message 160 during a second discovery interval. The second discovery message 160 may include a request to reserve a paging interval during the second discovery interval, as explained further below. For example, the second device 120 may determine based on the information included in the first discovery message 150 to obtain further information related to the network 140 during the reserved paging interval. Further, the second discovery message 160 may further include the information received in the first discovery message 150. For example, the second device 120 may "resend" the information for devices that did not receive the first discovery message 150 (e.g., devices within range of the second device 120 but not within range of the first device 110). Alternatively or in addition, the second discovery message 160 may include information related to additional devices of the network 140 (e.g., the third device 130).

As will be appreciated, operation of the network 140 as described with reference to FIG. 1 may enable increased efficiency of communications between the devices 110, 120, 130. For example, because information may be "resent" by the second device 120 to devices that did not receive the first discovery message 150, additional devices may receive the information. Accordingly, a device that is new to the ad-hoc wireless network may receive information regarding the ad-hoc wireless network more quickly.

Figure 2:
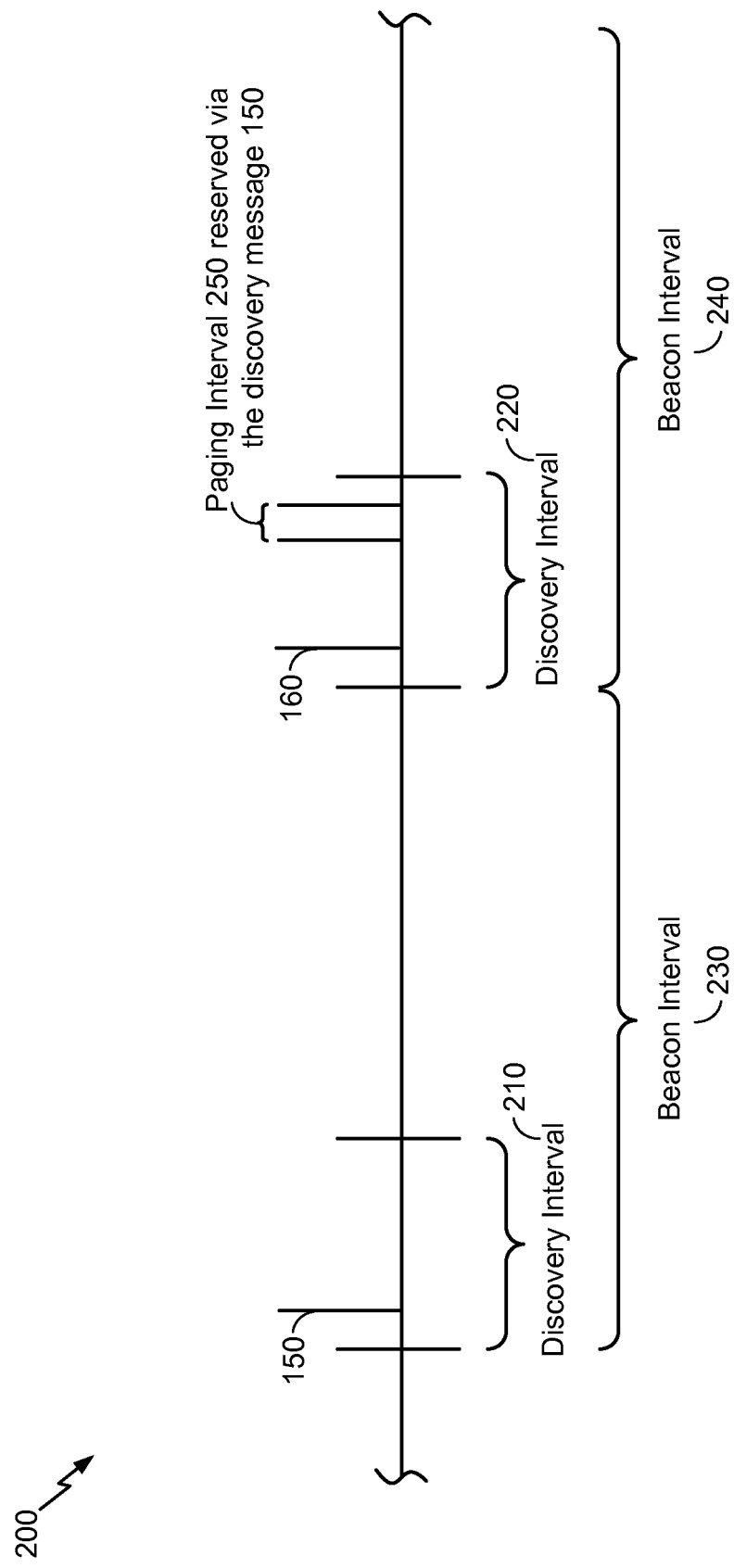
FIG. 2 depicts a timeline of successive discovery periods associated with a network, such as the network of FIG. 1.

FIG. 2 depicts an example timing diagram 200 that illustrates timing associated with transmission of discovery messages (e.g., discovery beacons), such as the first discovery message 150 of FIG. 1 and the second discovery message 160 of FIG. 1. The example timing diagram 200 may correspond to operation of a network, such as the network of FIG. 1, which may be an ad-hoc wireless network.

In the embodiment of FIG. 2, a discovery interval occurs once per beacon interval. For example, as shown in FIG. 2, a first discovery interval 210 is included in a first beacon interval 230 and a second discovery interval 220 is included in a second beacon interval 240. The first discovery interval 210 and the second discovery interval 220 may be reserved intervals associated with a network (such as the network 140 of FIG. 1) during which devices associated with the network transmit discovery messages, e.g., to "advertise" the network to potential new members of the network (e.g., via the first discovery message 150 of FIG. 1 and the second discovery message 160 of FIG. 1). The second discovery message 160 sent by the second device 120 may reserve a paging interval 250 during which the second device 120 may receive pages from other devices (e.g., requests for additional information cached at the second device 120), as explained further below.

As will be appreciated, reserving paging intervals during discovery intervals as described with reference to FIG. 2 may increase efficiency of communication within the network. For example, because devices are generally awake during discovery intervals to send discovery messages, reserving the paging interval 250 during the second discovery interval 220 may increase the number of devices that are available to send and receive pages as compared to scheduling a paging interval during the second beacon interval 240 outside of the second discovery interval 220.

Figure 3:
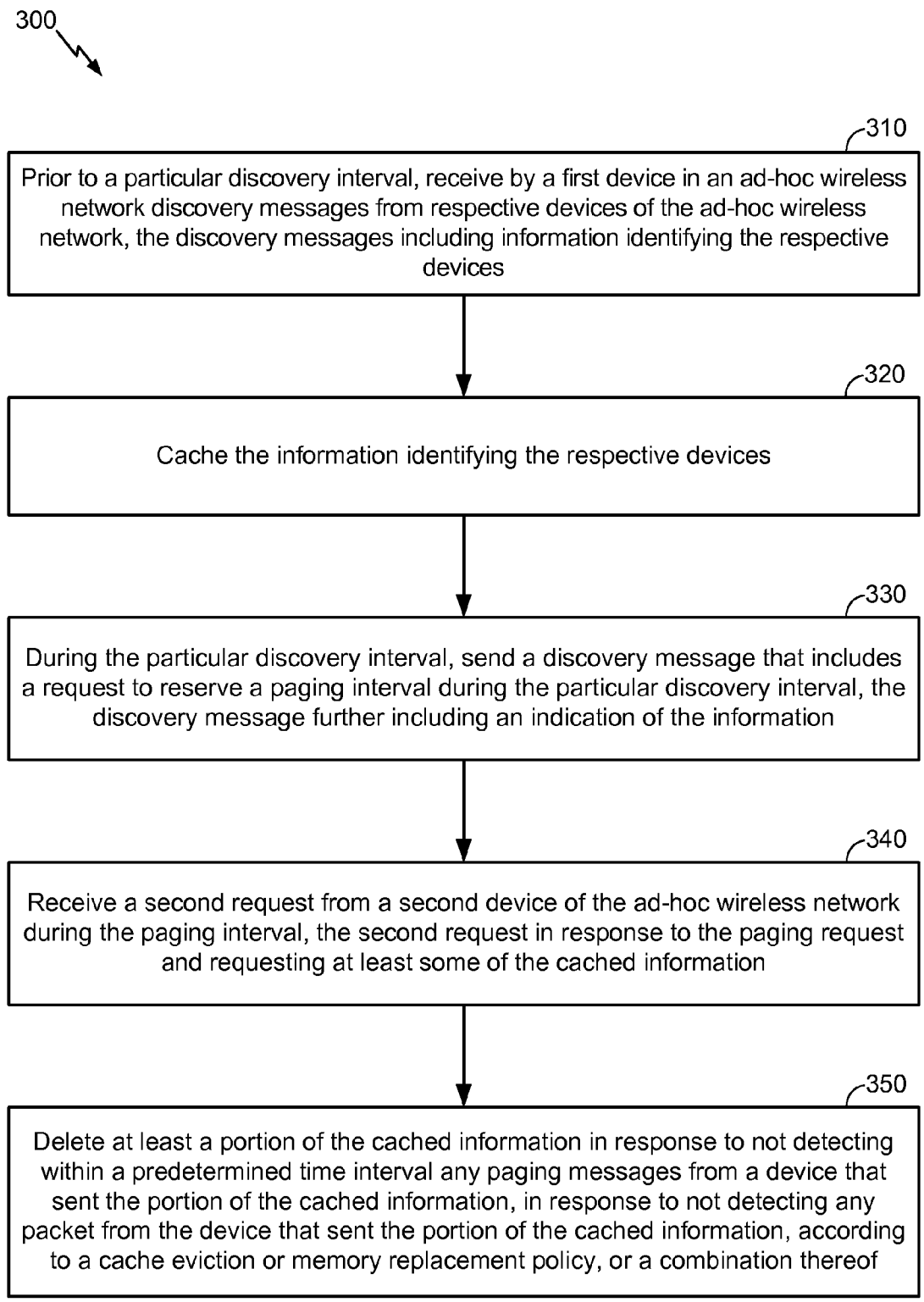
FIG. 3 depicts a flow chart of a particular embodiment of a method of operation of a device, such as one of the devices of FIG. 1.

FIG. 3 depicts a flow chart of a particular embodiment of a method 300 of operation of a first device of an ad-hoc wireless network (e.g., one of the devices 110, 120, 130 of the network 140 of FIG. 1). At 310, prior to a particular discovery interval, the first device receives discovery messages from respective devices of the ad-hoc wireless network. For example, the messages may be received during the first discovery interval 210 of FIG. 2, and the particular discovery interval may be the second discovery interval 220 of FIG. 2. The discovery messages include information identifying the respective devices. At 320, the first device caches the information identifying the respective devices.

At 330, during the particular discovery interval, the first device may send a discovery message that includes a request to reserve a paging interval during the particular discovery interval. For example, the first device may send the second discovery message 160 of FIGS. 1 and 2 including a request to reserve the paging interval 250. The discovery message further includes an indication of the information. For example, the indication of the information may be the information, a compressed representation of the information, or an indication that the information is cached by the first device (e.g., one or more bits that indicate that the first device has cached information regarding other devices of the ad-hoc wireless network).

At 340, a second request is received during the paging interval from a second device of the ad-hoc wireless network. The second request is in response to the paging request and requests at least some of the information cached by the first device. The first device may respond to the second request by sending the requested cached information, or a portion thereof, to the second device.

At 350, the first device may delete at least a portion of the cached information. Various techniques for deleting the cached information may be used. According to a first technique, the first device may delete a portion of the cached information in response to not detecting any paging messages from a device associated with the portion of the cached information within a particular time interval. According to a second technique, the first device may delete a portion of the cached information in response to not detecting any packet from the device associated with the portion of the cached information within the particular time interval. According to a third technique, the first device may delete a portion of the cached information according to a cache eviction or memory replacement policy. According to at least one embodiment, the first device may employ a combination of the first technique, the second technique, and the third technique.

The method 300 of FIG. 3 may increase the rate at which a device that is new to the ad-hoc wireless network learns about the ad-hoc wireless network. For example, in a conventional network, a newly arriving device may incur delay in discovering network devices if the new device relies on analyzing each discovery message transmission from each respective device. In accordance with the method 300 of FIG. 3, one discovery message may indicate information (or indicate that information is cached) related to multiple network devices. Further, by selectively deleting cached information that may no longer be of use (e.g., information corresponding to a device that has left the ad-hoc wireless network), the cache or memory space used can be reduced to increase memory space for storing information related to new network devices.

Figure 4:
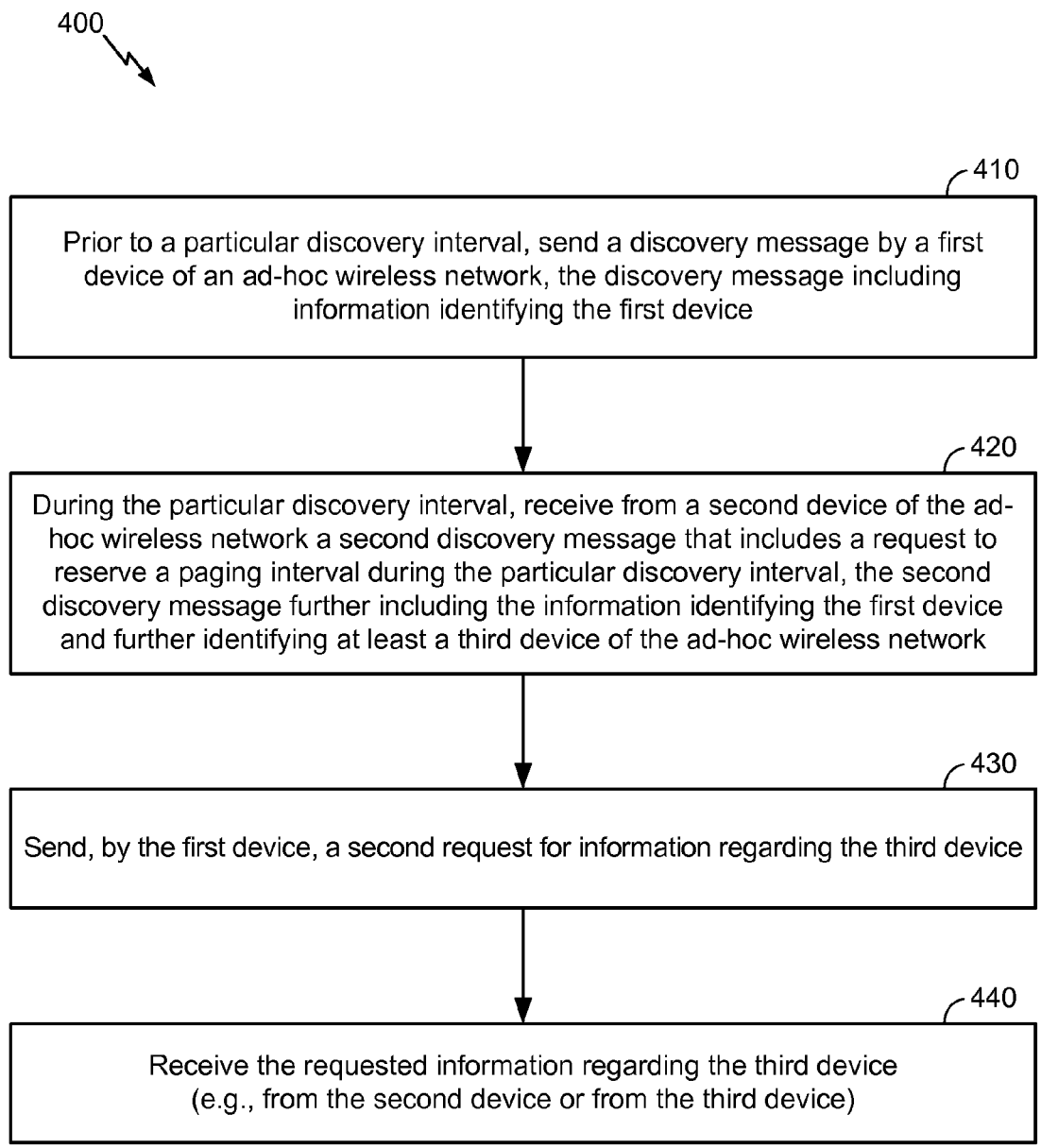
FIG. 4 depicts a flow chart of a particular embodiment of a method of operation of a device, such as one of the devices of FIG. 1.

FIG. 4 depicts a flow chart of a particular embodiment of a method 400 of operation of a first device of an ad-hoc wireless network (e.g., one of the devices 110, 120, 130 of the network 140 of FIG. 1). At 410, prior to a particular discovery interval, the first device sends a discovery message. For example, the discovery message may be sent during the first discovery interval 210 of FIG. 2, and the particular discovery interval may be the second discovery interval 220 of FIG. 2. The discovery message includes information identifying the first device.

At 420, during the particular discovery interval, the first device may receive from a second device of the ad-hoc wireless network a second discovery message that includes a request to reserve a paging interval during the particular discovery interval. The paging interval may be the paging interval 250 of FIG. 2. The second discovery message may further include information regarding one or more devices in the ad-hoc wireless network. For example, in FIG. 4, the second discovery message includes information identifying the first device (based on the information in the discovery message sent by the first device prior to the particular discovery interval) and further identifies at least a third device of the ad-hoc wireless network (which may be based on a discovery message sent by the third device).

At 430, the method 400 includes sending, by the first device, a second request for information regarding the third device. The second request may be sent in response to the second discovery message. For example, the first device may determine that the third device is running a service of interest to the first device or has other information of interest to the first device. The second request may be sent during the paging interval.

According to a first technique, the first device sends the second request to the device that sent the information identifying the third device (i.e., the second device), since the first device may have cached the information regarding the third device. According to at least another technique, the first device sends the second request directly to the third device. At 440, the first device receives the requested information regarding the third device (e.g., from the second device or from the third device).

The method 400 of FIG. 4 may enable enhanced availability of device information. For example, by requesting cached information, devices may receive information related to a non-responsive device (e.g., a device in a sleep mode).

Figure 5:
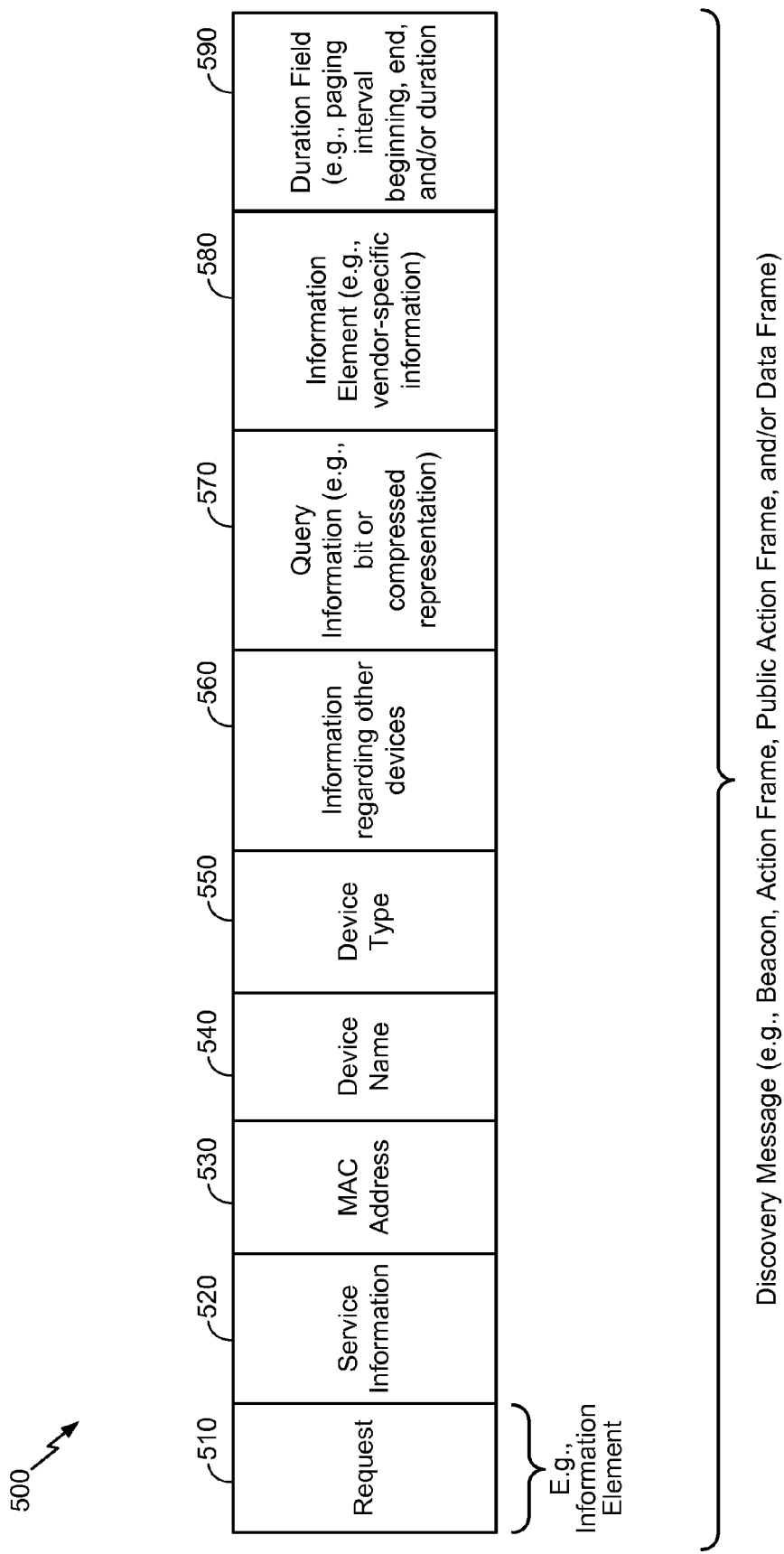
FIG. 5 depicts a particular illustrative embodiment of a discovery message.

Referring to FIG. 5, a particular illustrative embodiment of a discovery message (e.g., the first discovery message 150, the second discovery message 160, or a combination thereof) is depicted and generally designated 500. In at least one embodiment, the discovery message 500 is used to advertise an ad-hoc wireless network, or to advertise device information, service information, other features described further below, or a combination thereof.

As shown in FIG. 5, the discovery message 500 includes multiple fields, such as a request 510 to reserve a paging interval, such as the paging interval 250 of FIG. 2. As shown in FIG. 5, one or more of the fields of the discovery message 500 may be included in an information element (IE) included in or appended to the discovery message 500.

The discovery message 500 may further include service information 520, a timestamp, a media access control (MAC) address 530 of a device sending the discovery message 500, a device name 540 of the sending device, a device type 550 of the sending device, information 560 regarding other devices in the ad-hoc wireless network, query information 570 (e.g., a bit or a compressed representation of the information regarding the other devices of the ad-hoc wireless network) indicating that the sending device accepts queries regarding other devices in the ad-hoc wireless network, an information element 580 (e.g., vendor-specific information related to the sending device), a duration field (e.g., indicating one or more of a begin time of a paging interval, an end time of the paging interval, and a duration of the paging interval), or a combination thereof. The discovery message 500 may be a beacon frame, an action frame, a public action frame, a data frame, or a combination thereof.

As will be appreciated, use of the discovery message 500 of FIG. 5 may enable increased network efficiency. For example, because the discovery message 500 indicates a paging interval beginning, end, and/or duration (e.g., via the duration field 590), paging intervals may be scheduled efficiently within the network, such as by using the duration field 590 of the discovery message 500 to scheduling a paging interval during a particular discovery interval during which the discovery message 500 was sent. Accordingly, the discovery message 500 of FIG. 5 may enable increased efficiency of paging communications (e.g., by avoiding waiting until after the particular discovery interval to transmit paging messages).

Figure 6:
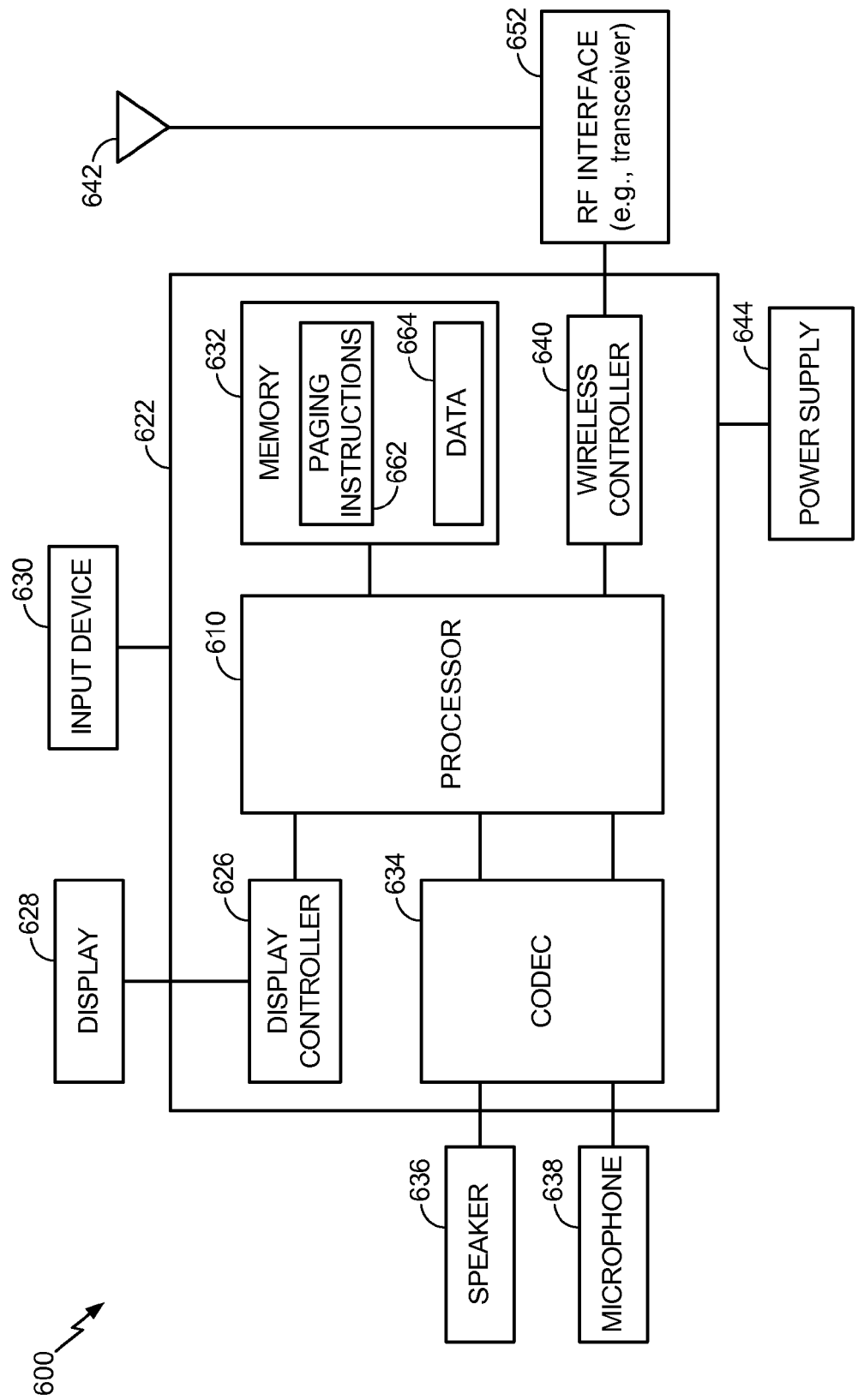
FIG. 6 depicts a particular illustrative embodiment of a device, such as one of the devices of FIG. 1.

Referring to FIG. 6, a block diagram of a particular illustrative embodiment of a device is depicted and generally designated 600. The mobile device 600 may correspond to one of the devices described with reference to FIG. 1, such as any of the devices 110, 120, 130. The mobile device 600 includes a processor 610, such as a digital signal processor (DSP). The processor 610 may be coupled to a memory 632 (e.g., a non-transitory computer-readable medium). The memory 632 may store instruction, such as paging instructions 662, that are executable by the processor 610. The memory 632 may store data 664 that is accessible to the processor 610. In a particular embodiment, the paging instructions 662 are executable by the processor 610 to cause the processor 610 to perform the method 300 of FIG. 3, the method 400 of FIG. 4, or a combination thereof.

FIG. 6 also shows a display controller 626 that is coupled to the processor 610 and to a display 628. A coder/decoder (CODEC) 634 can also be coupled to the processor 610. A speaker 636 and a microphone 638 can be coupled to the CODEC 634. FIG. 6 also indicates that a wireless controller 640 can be coupled to the processor 610. The wireless controller 640 may be further coupled to an antenna 642 via a radio frequency (RF) interface 652 (e.g., a transceiver).

In a particular embodiment, the processor 610, the display controller 626, the memory 632, the CODEC 634, and the wireless controller 640 are included in a system-in-package or system-on-chip device 622. An input device 630 and a power supply 644 may be coupled to the system-on-chip device 622. Moreover, in a particular embodiment, and as illustrated in FIG. 6, the display 628, the input device 630, the speaker 636, the microphone 638, the antenna 642, the RF interface 652, and the power supply 644 are external to the system-on-chip device 622. However, each of the display 628, the input device 630, the speaker 636, the microphone 638, the antenna 642, the RF interface 652, and the power supply 644 can be coupled to a component of the system-on-chip device 622, such as to an interface or a controller.

In operation, the processor 610 may execute the paging instructions 662 to receive, prior to a particular discovery interval of an ad-hoc wireless network, discovery messages from respective devices of the ad-hoc wireless network. The discovery messages may include information identifying the respective devices. The processor 610 may further execute the paging instructions 662 to cache the information identifying the respective devices and to send, during the particular discovery interval, a first discovery message that includes a request to reserve a paging interval during the particular discovery interval. The first discovery message further includes an indication of the information.

Alternatively or in addition, the processor 610 may execute the paging instructions 662 to send, prior to a particular discovery interval, a first discovery message in an ad-hoc wireless network. The first discovery message includes information identifying the first device. The processor 610 may further execute the paging instructions 662 to receive, during the particular discovery interval and from a second device of the ad-hoc wireless network, a second discovery message that includes a request to reserve a paging interval during the particular discovery interval. The second discovery message further includes information identifying the first device and further identifying a third device of the ad-hoc wireless network. The processor 610 may further execute the paging instructions 662 to send a second request that requests information regarding the third device.

In connection with the embodiments described herein, an apparatus includes means for receiving (e.g., the RF interface 652), prior to a particular discovery interval and by a first device (e.g., one of the devices 110, 120, 130, 600) in an ad-hoc wireless network (e.g., the network 140), discovery messages from respective devices (e.g., others of the devices 110, 120, 130, 600) of the ad-hoc wireless network and for sending, during the particular discovery interval, a first discovery message. The discovery messages include information identifying the respective devices. The first discovery message includes a request to reserve a paging interval during the particular discovery interval and further includes an indication of the information. The apparatus further includes means for caching (e.g., the memory 632) the information. For example, the information may correspond to the data 664.

In connection with the embodiments described herein, an apparatus includes means for sending (e.g., the RF interface 652), prior to a particular discovery interval, a first discovery message by a first device (e.g., one of the devices 110, 120, 130, 600) of an ad-hoc wireless network (e.g., the network 140), for receiving, during the particular discovery interval, a second discovery message from a second device (e.g., another of the devices 110, 120, 130, 600) of the ad-hoc wireless network, and for sending a second request. The first discovery message includes information identifying the first device. The second discovery message includes a request to reserve a paging interval during the particular discovery interval and information identifying the first device and further identifying a third device of the ad-hoc wireless network. The second request requests information regarding the third device. The apparatus further includes means for caching (e.g., the memory 632) the information. For example, the information may correspond to the data 664.

Figure 7:
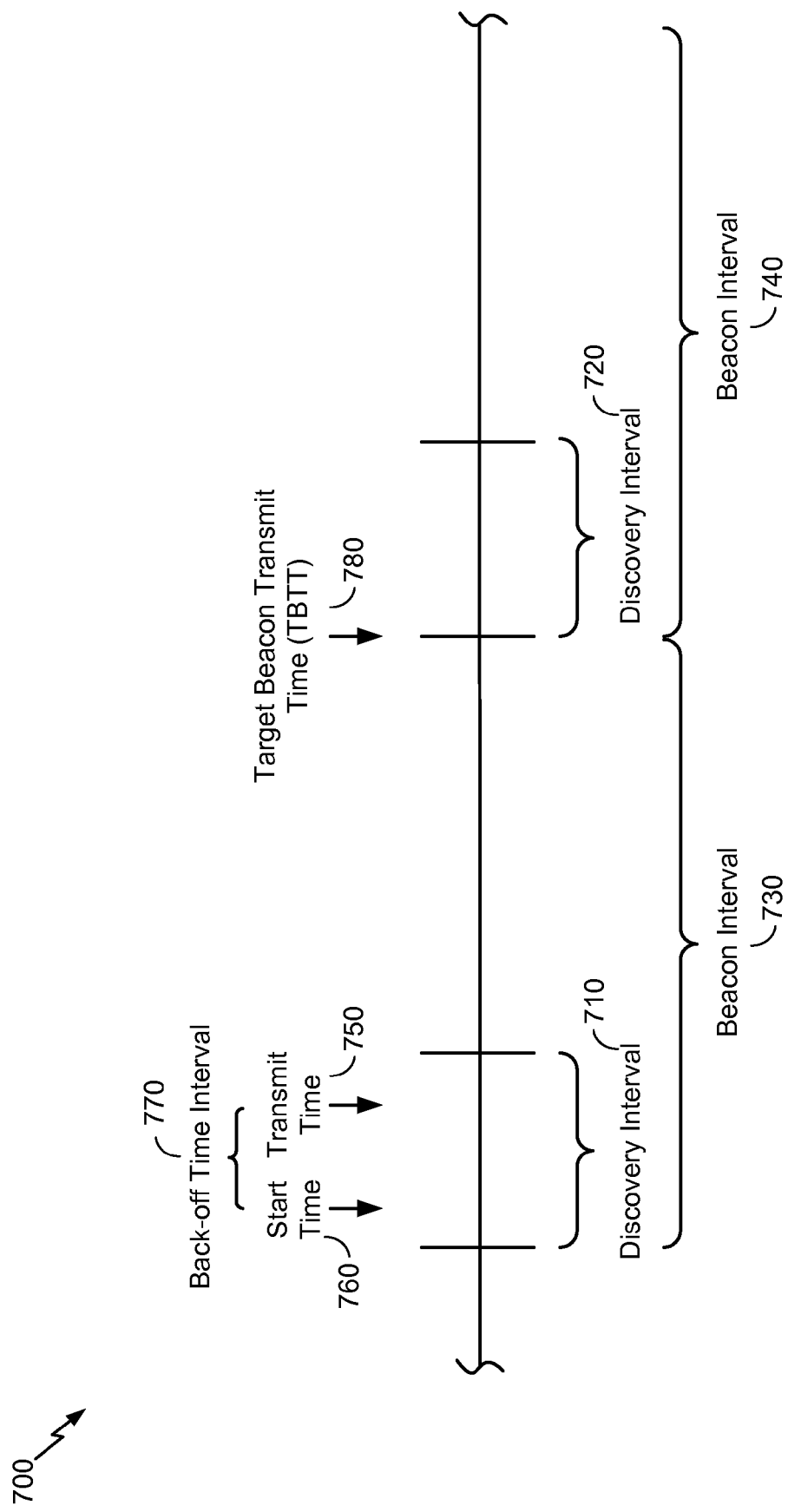
FIG. 7 depicts a timeline of successive beacon intervals associated with a network, such as the network of FIG. 1.

FIG. 7 depicts an example timing diagram 700 that illustrates timing associated with transmission of discovery messages, such as the first discovery message 150 of FIG. 1 and the second discovery message 160 of FIG. 1. In the embodiment of FIG. 7, a discovery interval occurs once each beacon interval. For example, as shown in FIG. 7, a first discovery interval 710 is included in a first beacon interval 730 and a second discovery interval 720 is included in a second beacon interval 740. The first discovery interval 710 and the second discovery interval 720 may be reserved intervals associated with a network (such as the network 140 of FIG. 1) during which devices associated with the network transmit beacons, e.g., to "advertise" the network to potential new members of the network (e.g., via transmission of beacons, such as the first discovery message 150 of FIG. 1 and the second discovery message 160 of FIG. 1). In a particular embodiment, the beacon interval represents a fundamental division of time (i.e., a duty cycle associated with operation in the network is defined as a duration of the discovery interval divided by a duration of the beacon interval).

In the example of FIG. 7, a device (e.g., the first device 110 of FIG. 1) transmits a beacon at a transmit time 750 determined by a start time 760 plus a back-off time interval 770. In at least one embodiment, the device determines the start time randomly or pseudo-randomly from a range of start times (e.g., from a range of times within the first discovery interval 710). Further, the device may determine the back-off time interval 770 randomly or pseudo-randomly from a range of back-off time intervals (e.g., a predetermined range of back-off time intervals). Other devices of the network may independently select start times and back-off timer intervals, which may also be selected randomly or pseudo-randomly.

Because a device operating in accordance with the timing diagram 700 of FIG. 7 selects the start time 760 and the back-off time interval 770 independently of other devices (e.g., randomly or pseudo-randomly), the likelihood of multiple devices transmitting beacons at the transmit time 750 is reduced. Accordingly, more devices in the network may transmit beacons during the first discovery interval 710 (and in subsequent discovery intervals, such as the second discovery interval 720). Hence, ad-hoc networks may be advertised to potential new member devices more quickly, enabling improved network performance.

The device may also receive beacons from one or more other devices during the first discovery interval 710. The device may use information determined based on the received beacons to determine content of a beacon transmitted during the second discovery interval 720. For example, the device may count how many beacons associated with the network the device receives from other devices of the network. The device may estimate a number of devices that are associated with the network based on the count of the received beacons. During the second discovery interval 720, a beacon transmitted by the device may include information related to the estimated number of devices that are associated with the network, as described further below.

FIG. 7 further depicts an alternate embodiment of a beacon interval where a discovery interval is associated with a target beacon transmit time (TBTT). Specifically, for the second beacon interval 740, the second discovery interval 720 is associated with a TBTT 780. The TBTT 780 may be a designated time at which network devices each attempt to transmit a beacon (i.e., the network devices contend for beacon transmission) instead of selecting start times and transmit times as described with reference to the first discovery interval 710. In at least one embodiment, any sleeping network devices wake up for beacon contention at the TBTT 780. Such beacon contention may be performed according to a carrier sense multiple access (CSMA) technique.

Figure 8:
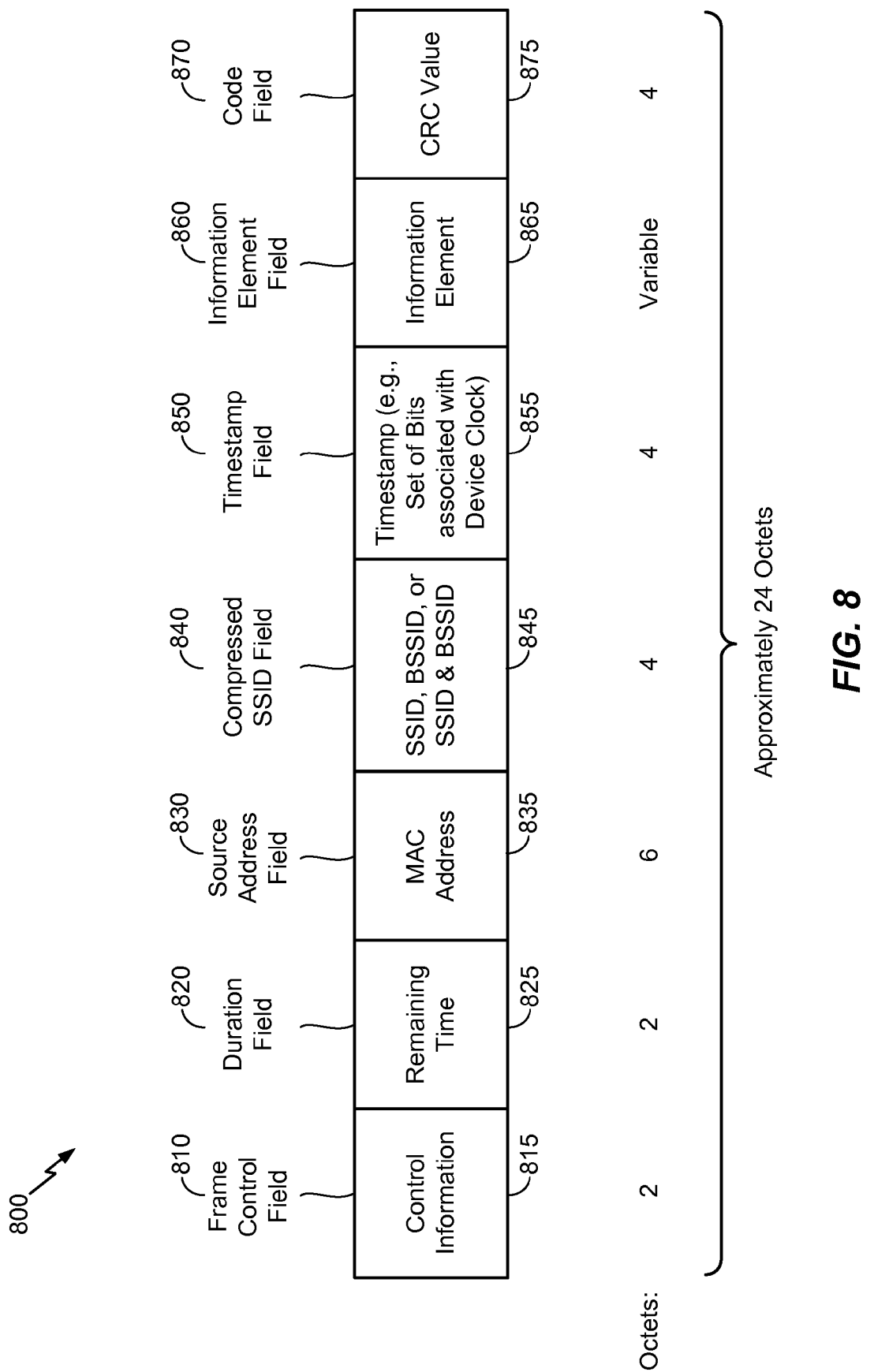
FIG. 8 depicts an embodiment of a short beacon associated with a network, such as the network of FIG. 1.

FIG. 8 depicts a particular illustrative embodiment of a beacon 800, which may be the first discovery message 150 of FIG. 1, the second discovery message 160 of FIG. 1, another discovery message (not shown), or a combination thereof. The beacon 800 may be transmitted by the first device 110 of FIG. 1 and may be associated with the network 140 of FIG. 1.

In the example of FIG. 8, the beacon 800 includes a frame control field 810, a duration field 820, a source address field 830, a compressed service set identification field (SSID) 840, a timestamp field 850, an information element field 860, and a code field 870. In other embodiments, the beacon 800 may include more fields or fewer fields. In the particular illustrative embodiment of FIG. 8, the frame control field 810 includes control information 815, the duration field 820 indicates a remaining time 825 in a discovery interval, the source address field 830 includes a numeric identifier (e.g., a media access control (MAC) address 835) associated with a device transmitting the beacon 800 (e.g., the first device 110 of FIG. 1), the compressed SSID field 840 includes data that indicates at least one of an SSID associated with the network and a basic service set identification (BSSID) associated with the network (generally designated 845 in FIG. 8), the timestamp field 850 includes a timestamp 855 (e.g., a set of bits associated with an internal clock of the transmitting device, such a set of four least significant bits of the internal clock), the information element field 860 includes information 865 related to one or more of an application accessing the network, a vendor of the transmitting device, a time at which the transmitting device is to be available to receive a probe request, or a combination thereof, and the code field 870 includes a cyclic redundancy check (CRC) value 875. In a particular embodiment, data in the compressed SSID field 840 is a compressed representation of the SSID of the network, the BSSID of the network, or both.

In a particular illustrative embodiment, the beacon 800 is a "short beacon" that includes approximately 24 octets of information, as shown in FIG. 8. In at least one embodiment, the information element field 860 is of a variable length and depends on a particular application operating on the device that is transmitting the beacon. In at least one embodiment, and as described further below, each device in the network may independently determine a duration of a current discovery interval during which the beacon 800 is transmitted. Accordingly, the duration field 820 may include a remaining time 825 in the current discovery interval as determined by the device transmitting the beacon 800.

A duration of a beacon interval (e.g., the first beacon interval 230 and the second beacon interval 240) may be determined according to various techniques. According to a first technique, the duration of the beacon interval is standardized, e.g., predetermined according to a wireless communication protocol or standard. According to a second technique, the duration of the beacon interval is determined by an application utilizing the network. According to a third technique, the duration of the beacon interval may be determined by the device that forms the network.

Figure 9:
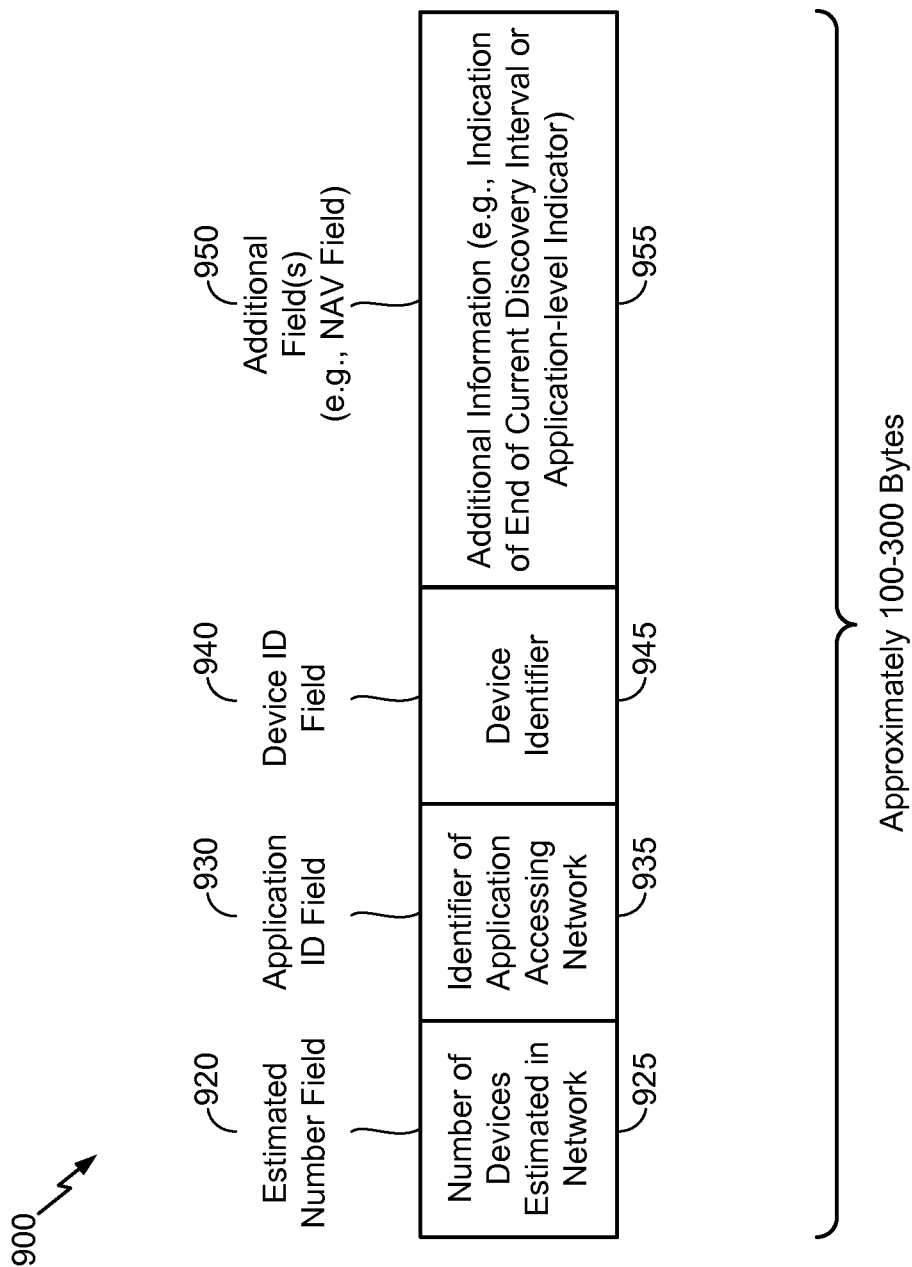
FIG. 9 depicts an embodiment of a full beacon associated with a network, such as the network of FIG. 1.

FIG. 9 depicts a particular illustrative embodiment of a beacon 900, which may correspond to the first discovery message 150 of FIG. 1, the second discovery message 160 of FIG. 1, another discovery message, or a combination thereof. The beacon 900 may be transmitted by the first device 110 of FIG. 1 and may be associated with (e.g., "advertise") the network 140 of FIG. 1.

The beacon 900 of FIG. 9 includes an estimated number field 920, an application ID field 930, a device ID field 940, and one or more additional fields 950 (e.g., a network allocation vector (NAV) field or one or more of the fields 810, 820, 830, 840, 850, 860, and 870 of FIG. 8). In a particular embodiment, the estimated number field 920 includes an indication 925 of a number of devices estimated in the network by the device transmitting the beacon 900, the application ID field 930 includes an identifier 935 of an application accessing the network via the device transmitting the beacon 900, the device ID field 940 includes a device identifier 945 associated with the device transmitting the beacon 900 (e.g., for a particular application executing on the device, an identification of the device), and additional information 955 (e.g., an indication of an end of a current discovery interval, as described with reference to FIG. 8, or an application-level indicator used to estimate a number of devices in the network, as described further below).

In at least one embodiment, the beacon 900 of FIG. 9 is a "full" beacon, such as a beacon defined in accordance with an Institute of Electrical and Electronics Engineers (IEEE) 802.11 standard for a wireless local area network (WLAN). Accordingly, the beacon 900 may include further information defined by the IEEE 802.11 standard but not depicted in FIG. 9. Such information may be transmitted in the one or more additional fields 950. As illustrated in FIG. 9, the beacon 900 includes approximately 100-300 bytes.

The beacon 800 of FIG. 8 and the beacon 900 of FIG. 9 facilitate management of an ad-hoc wireless network, such as the network 140 of FIG. 1. For example, the beacons 800 and 900 include information that may be used by devices that receive the beacons to determine a number of devices in the ad-hoc network, to estimate a number of hidden device of the ad-hoc network, to estimate a duration of the discovery interval, to determine whether to join the ad-hoc network, and to determine whether to initiate a separate ad-hoc network, each of which is described further below.

Figure 10:
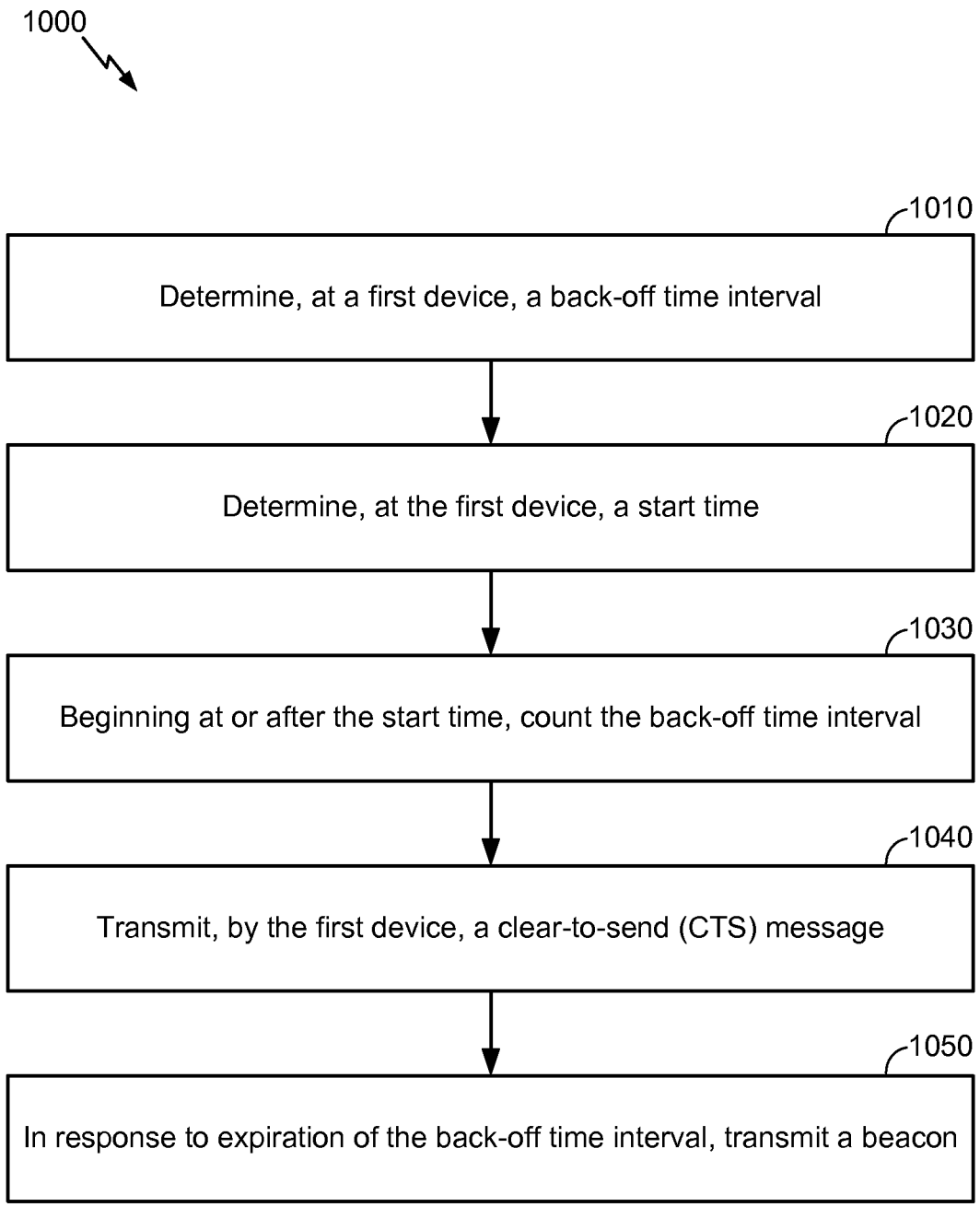
FIG. 10 depicts a flow chart of a particular embodiment of a method of operation of a device, such as one of the devices of FIG. 1.

FIG. 10 depicts a flow chart of a particular embodiment of a method 1000 of operation of a device, such as the first device 110 of FIG. 1, the second device 120 of FIG. 1, the third device 130 of FIG. 1, or a combination thereof. The method 1000 may be performed within a network, such as the network 140 of FIG. 1. The network may be an ad-hoc wireless network.

The method 1000 includes determining, at a first device, a back-off time interval, at 1010, and determining, at the first device, a start time, at 1020. For example, the first device may select the back-off time interval randomly or pseudo-randomly from a predetermined range of back-off intervals. The start time may be a time selected randomly or pseudo-randomly from a range of start times within a discovery interval of a beacon interval. The first device may determine the back-off time interval and the start time interval independently of other devices of the network. For example, each device of the network may randomly or pseudo-randomly select a back-off time interval and a start time within the discovery interval. Additionally, a duration of the discovery interval may be determined independently by each device. For example, as explained further below, each device may determine a duration of the discovery interval based on an estimate of how many devices are in the network. The estimate of how many devices are in the network may be determined based on how many beacons the device observed in a previous beacon interval, based on how many beacons one or more other devices observed in a previous beacon interval, or a combination thereof.

As explained with reference to FIGS. 2 and 7, the discovery interval may be a portion of a beacon interval, such as a beacon interval associated with an independent basic service set (IBSS) network. A duration of the beacon interval may be common to devices of the network. For example, a duration of the beacon interval may be predetermined according to a wireless protocol. In another example, a duration of the beacon interval is determined based on an application operating on the first device. In another example, a duration of the beacon interval is determined by a device associated with initialization of the IBSS network. To facilitate maintaining the common beacon interval, the devices of the network may synchronize internal clocks with one another or with an external clock, such a clock associated with a cellular communication system.

Beginning at or after the start time, the device may count the back-off time interval, at 1030. The method 1000 further includes transmitting, by a first device, a clear-to-send (CTS) message, at 1040 (e.g., a frame indicating that data is to be transmitted in order to clear a next discovery interval of traffic). For example, if no conflicting beacon is detected during the back-off time interval, the device may send the CTS message to reserve a transmission medium. In other examples, no CTS message is sent. In response to expiration of the back-off time interval (and after the CTS message is sent if the CTS message is sent), the device may transmit a beacon, at 1050. The beacon may be a short beacon, such as the beacon 800 of FIG. 8, or a full beacon, such as the beacon 900 of FIG. 9.

Thus, the method 1000 facilitates mitigating risk of conflict during the discovery interval by causing each device of the network select both a back-off time interval and a start time for transmission of a beacon. The devices starting at randomly or pseudo-randomly selected start times and counting off randomly or pseudo-randomly selected back-off time intervals may conflict with one another less frequently than, for example, devices that only select a back-off time interval and begin counting their respective back-off time intervals at the beginning of the discovery interval.

Figure 11:
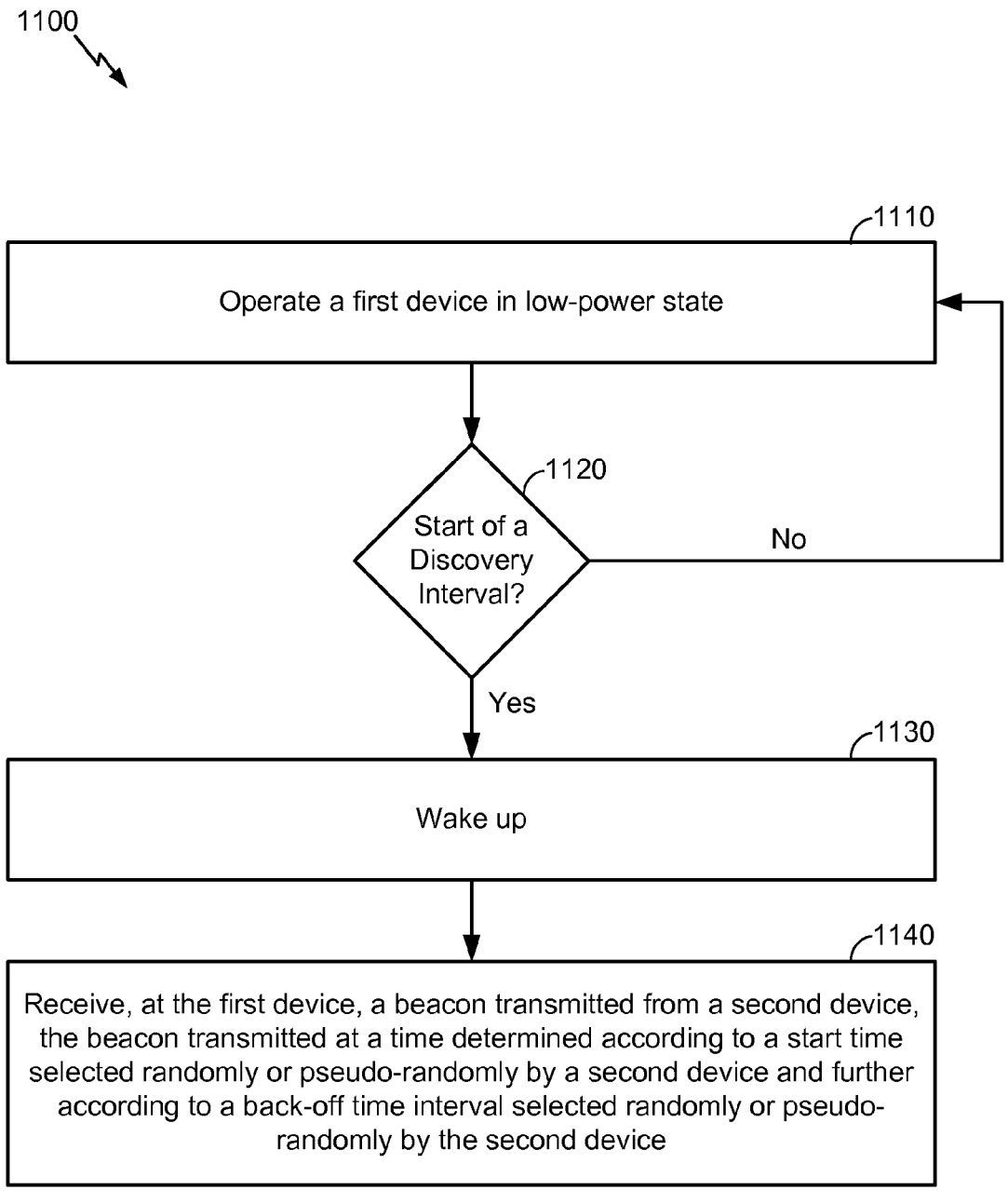
FIG. 11 depicts a flow chart of a particular embodiment of a method of operation of a device, such as one of the devices of FIG. 1.

FIG. 11 depicts a flow chart of a particular embodiment of a method 1100 of operation of a device, such as the first device 110 of FIG. 1, the second device 120 of FIG. 1, the third device 130 of FIG. 1, or a combination thereof. The method 1100 may be performed within a network, such as the network 140 of FIG. 1. The network may be an ad-hoc wireless network.

The method 1100 includes operating a first device in low-power state, at 1110. For example, during the beacon interval 730 of FIG. 7 outside the first discovery interval 710, the first device may operate in the low-power state to conserve power when no beacons are expected.

At 1120, the first device determines whether a discovery interval is beginning. If a discovery interval is not beginning, then the first device may continue to operate in the low-power state, at 1110. If a discovery interval is beginning, the first device wakes up, at 1130. The method 1100 further includes receiving, at the first device, a beacon transmitted from a second device. The beacon is transmitted at a time determined according to a start time selected randomly or pseudo-randomly by the second device and further according to a back-off time interval selected randomly or pseudo-randomly by the second device, at 1140. The beacon may be a full beacon, such as the beacon 900 of FIG. 9, or a short beacon, such as the beacon 800 of FIG. 8. Each device of the network may randomly or pseudo-randomly select a start time and a back-off time interval. Thus, the beacon may be received from the second device at a time, within the discovery interval, selected by the second device. The method 1100 facilitates mitigating risk of conflict during the discovery interval by causing each device of the network to select both a back-off time interval and a start time for transmission of a beacon. The devices starting at randomly or pseudo-randomly selected start times and counting off randomly or pseudo-randomly selected back-off time intervals may conflict with one another less frequently than, for example, devices that only select a back-off time interval and begin counting their respective back-off time intervals at the beginning of the discovery interval. A duration of the discovery interval may be determined independently by one or more devices of an ad-hoc network based on information received in or determined based on beacons received by each device and within the beacon interval.

In a particular embodiment, after receiving one or more beacons and possibly transmitting a beacon, as described with reference to FIG. 10, the first device may return to the low-power state. The first device may wake up again for a next discovery interval.

Figure 12:
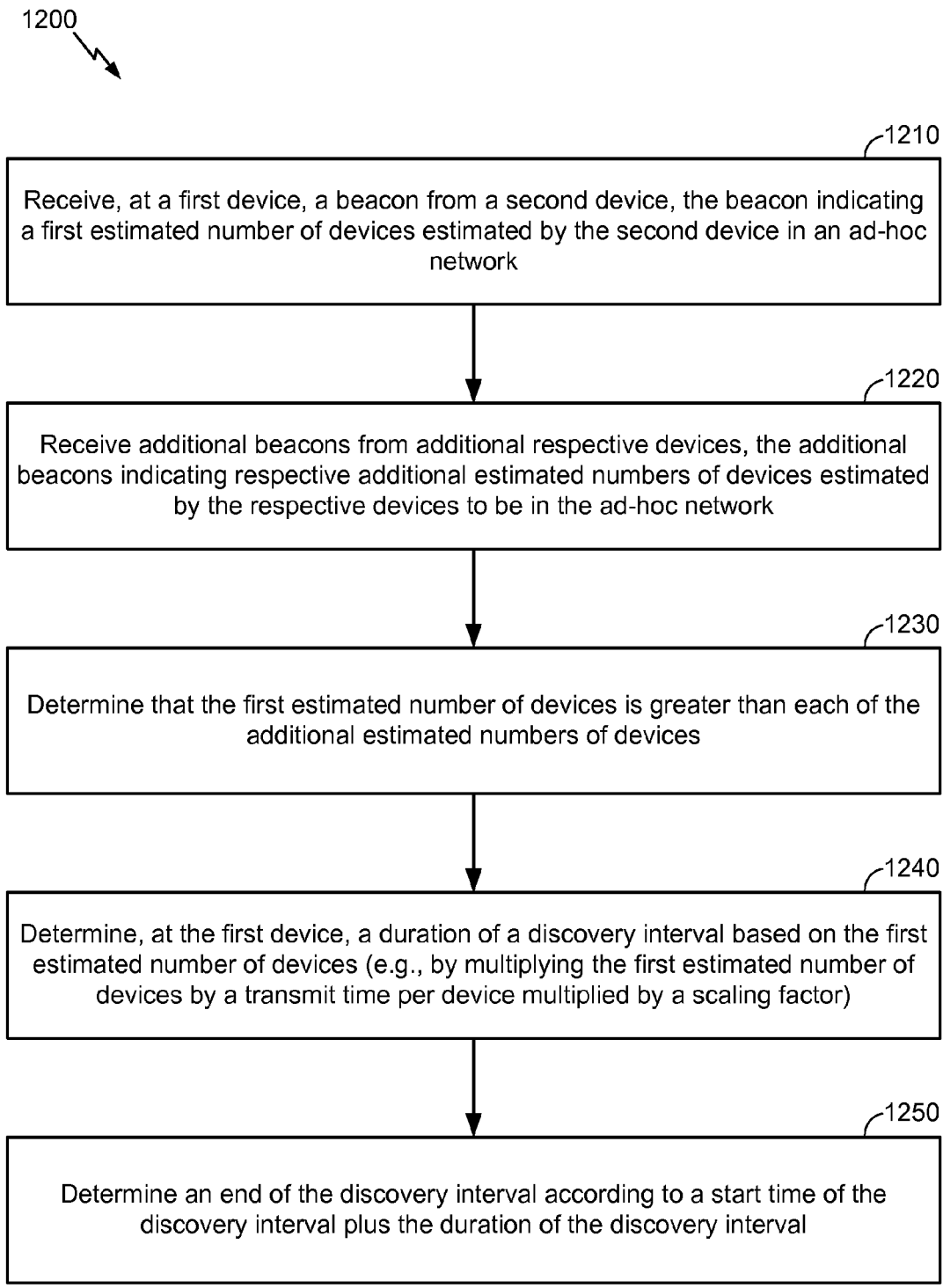
FIG. 12 depicts a flow chart of a particular embodiment of a method of operation of a device, such as one of the devices of FIG. 1.

FIG. 12 depicts a flow chart of a particular embodiment of a method 1200 of operation of a device, such as the first device 110 of FIG. 1, the second device 120 of FIG. 1, the third device 130 of FIG. 1, or a combination thereof. The method 1200 may be performed within a network, such as the network 140 of FIG. 1. The network may be an ad-hoc wireless network.

The method 1200 includes receiving, at a first device, a beacon from a second device, the beacon indicating a first estimated number of devices estimated by the second device in an ad-hoc network, at 1210. For example, the second device may correspond to the second device 120 of FIG. 1, which may count beacons received during a discovery interval from other devices of the network 140, such as the third device 130. In this example, during a subsequent discovery interval, the second device 120 may transmit the beacon that is received by the first device 110. The beacon may indicate how many other devices the second device 120 estimates to be in the network 140. The second device 120 may determine the estimate of how many devices are in the network 140 based on the count of beacons received at the second device 120, based on content of the beacons received by the second device 120 (e.g., counts of beacons received by other devices of the network 140, etc.).

The method 1200 also includes receiving additional beacons from additional respective devices, at 1220. For example, the first device 110 of FIG. 1 may also receive a beacon from the third device 130. The additional beacons indicating respective additional estimated numbers of devices estimated by the respective devices to be in the ad-hoc network. At 1230, a determination is made that the first estimated number of devices is greater than each of the additional estimated numbers of devices. For example, the beacon received from the second device 120 of FIG. 1 may include a larger estimate of the number of devices in the network 140 than the estimate that is in the beacon received from the third device 130.

At 1240, the first device, determines a duration of a discovery interval based on the first estimated number of devices. For example, the first device may multiply the first estimated number of devices in the network by a beacon transmit time per device and by a scaling factor (selected to provide some space between beacon transmission to avoid conflicting transmissions). An end of the discovery interval is determined according to a start time of the discovery interval plus the duration of the discovery interval, at 1250. In a particular embodiment, the first device may include information related to the duration of the discovery interval in a beacon subsequently transmitted by the first device. For example, the beacon subsequently transmitted by the first device may include a network allocation vector (NAV) field that includes an indication of an end of a current discovery interval during which the beacon is transmitted as determined by the first device.

Thus, the method 1200 facilitates management of an ad-hoc network by enabling each device to determine a duration of the discovery interval in a manner that mitigates risk of conflict during the discovery interval.

Figure 13:
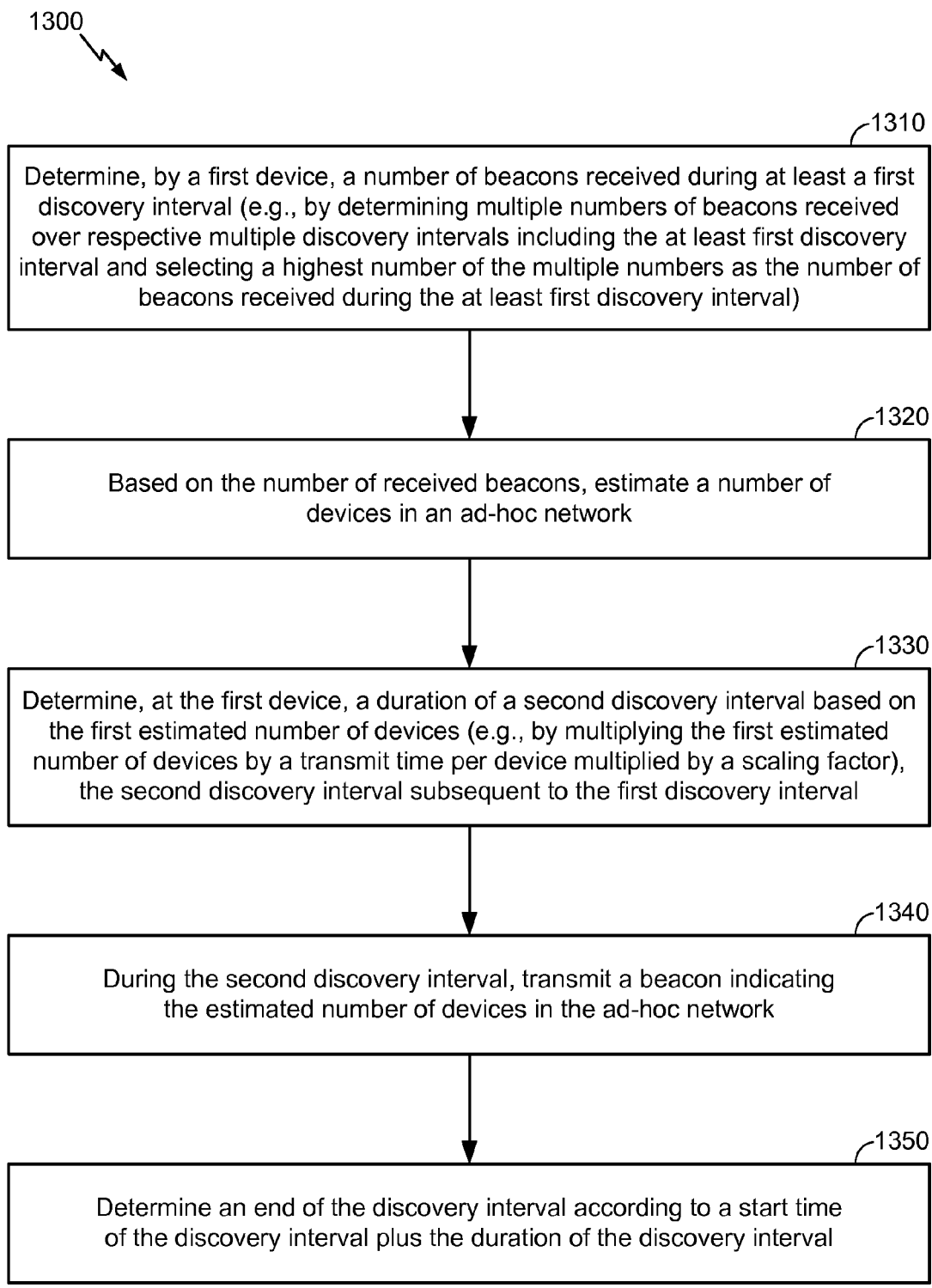
FIG. 13 depicts a flow chart of a particular embodiment of a method of operation of a device, such as one of the devices of FIG. 1.

FIG. 13 depicts a flow chart of a particular embodiment of a method 1300 of operation of a device, such as the first device 110 of FIG. 1. The method 1300 may be performed within a network, such as the network 140 of FIG. 1. The network may be an ad-hoc wireless network.

The method 1300 includes determining, by a first device, a number of beacons received during at least a first discovery interval, at 1310. For example, the first device may determine multiple numbers of beacons received over respective multiple discovery intervals including the at least first discovery interval and selecting a highest number of the multiple numbers as the number of beacons received during the at least first discovery interval. To illustrate, the second device 120 of FIG. 1 may receive four beacons during a first discovery interval and may receive eight beacons during a subsequent discovery interval. In this illustrative example, eight beacons may be selected as the highest number of beacons received during a discovery interval. Based on the number of received beacons, a number of devices in an ad-hoc network is estimated, at 1320. Thus, in the example above, the second device 120 of FIG. 1 may estimate that the network 140 includes eight devices since eight beacons were received. Alternately, the second device 120 may estimate that a different number of devices are in the network 140. To illustrate, the second device 120 may determine that one or more devices are hidden devices (i.e., devices from which the second device 120 did not receive beacons). The second device 120 may estimate the number of hidden devices of the network 140 and add the estimated number of hidden devices to the number of beacons received to determine the estimate of the number of devices in the network 140. The second device 120 may estimate the number of hidden devices based on information received in beacons from other devices, such as information indicating devices from which the other devices received beacons. As a specific example and as further described below, each beacon may include a numeric identifier that identifies the device that sent the beacon. A device that receives multiple beacons may generate a numeric representation that indicates other devices that it received beacons from based on the numeric identifiers of the other devices. For example, the numeric representation may be a centroid of the numeric identifiers.

At 1330, the first device determines a duration of a second discovery interval, which is subsequent to the first discovery interval, based on the first estimated number of devices. For example, the first device may multiply the first estimated number of devices by a transmit time per device and by a scaling factor. During the second discovery interval, a beacon is transmitted indicating the estimated number of devices in the ad-hoc network, at 1340. The method 1300 further includes determining an end of the discovery interval according to a start time of the discovery interval plus the duration of the discovery interval, at 1350.

Thus, the method 1300 facilitates management of an ad-hoc network by enabling each device to determine a duration of the discovery interval in a manner that mitigates risk of conflict during the discovery interval. Each device is also able to estimate the number of devices in the ad-hoc network, including hidden devices, based on information received in beacons from other devices.

Figure 14:
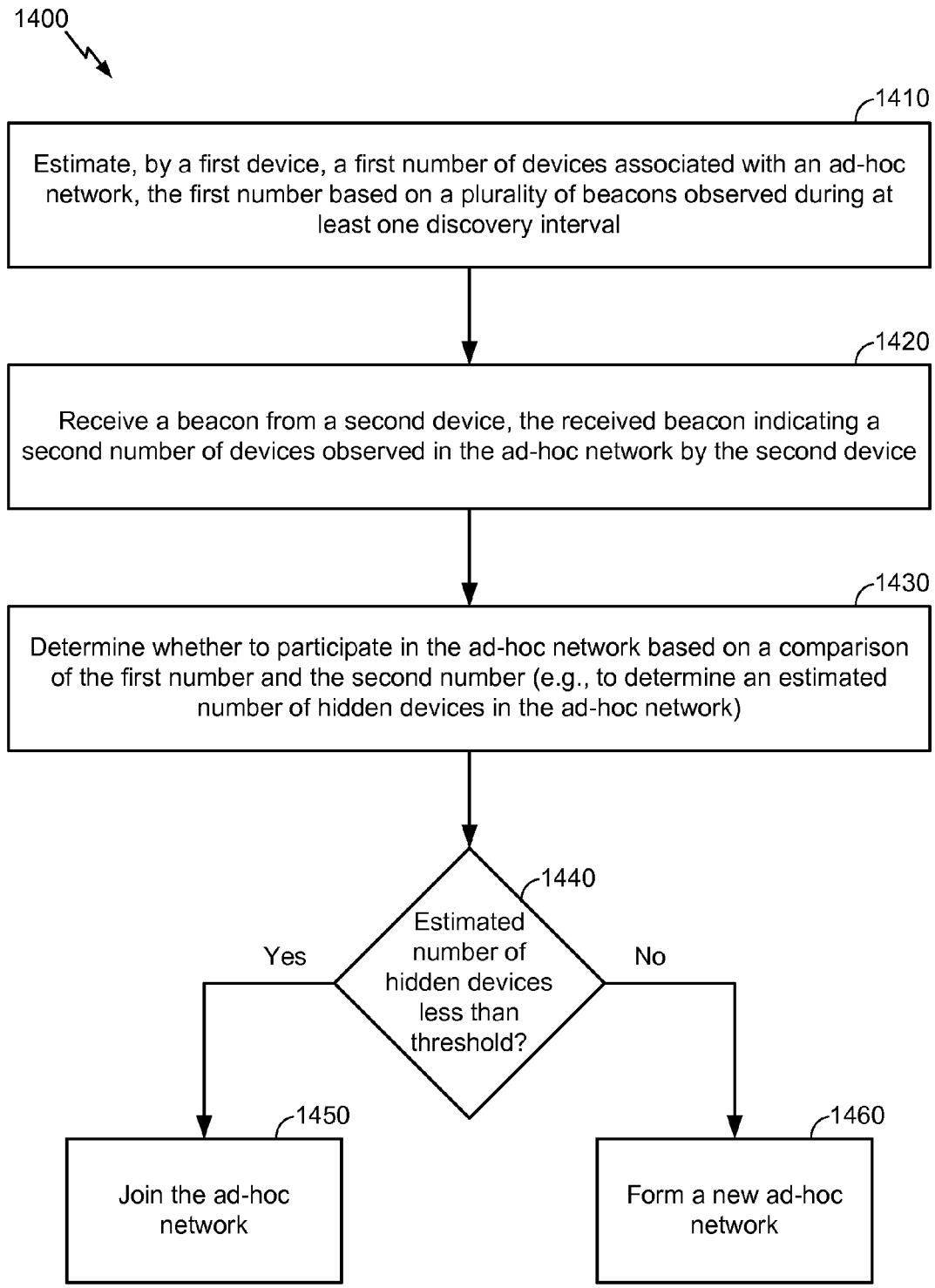
FIG. 14 depicts a flow chart of a particular embodiment of a method of operation of a device, such as one of the devices of FIG. 1.

FIG. 14 depicts a flow chart of a particular embodiment of a method 1400 of operation of a device, such as the first device 110 of FIG. 1, the second device 120 of FIG. 1, the third device 130 of FIG. 1, or a combination thereof. The method 1400 may be performed within a network, such as the network 140 of FIG. 1. The network may be an ad-hoc wireless network.

The method 1400 includes estimating, by a first device, a first number of devices associated with an ad-hoc network. The first number may be estimated based on a plurality of beacons observed during at least one discovery interval, 1410. For example, the second device 120 of FIG. 1 may receive four beacons during a first discovery interval and may receive eight beacons during a second discovery interval. The second device 120 may therefore estimate that the network 140 includes eight devices since eight beacons is the most beacons received during a recent discovery interval. Alternately, the second device 120 may estimate that a different number of devices are in the network 140, such as an estimated number of devices that includes hidden devices.

At 1420, a beacon is received from a second device, the received beacon indicating a second number of devices observed in the ad-hoc network by the second device. A determination is made whether to participate in the ad-hoc network based on a comparison of the first number and the second number, at 1430. For example, the first device may compare the first number to the second number to determine an estimated number of hidden devices (from the perspective of the first device) in the ad-hoc network. If the estimated number of hidden devices is less than threshold, at 1440, then the ad-hoc network is joined, at 1450. If the estimated number of hidden devices is not less than threshold, at 1440, then the ad-hoc network is not joined. As shown in FIG. 14, the first device may form a new ad-hoc network in response to determining that the estimated number of hidden devices is not less than the threshold, at 1450. The threshold may be set as a value that facilitates efficient communication. For example, if the first device determines that too many (i.e., more than the threshold) devices of the ad-hoc network are hidden to the first device, the first device may be able to communicate more efficiently by forming the new ad-hoc network including devices that are not hidden to the first device.

Thus, the method 1400 facilitates determining an estimate of the number of hidden devices in an ad-hoc network. The method 1400 further enables decision making regarding formation of new ad-hoc networks for efficient communication.

Figure 15:
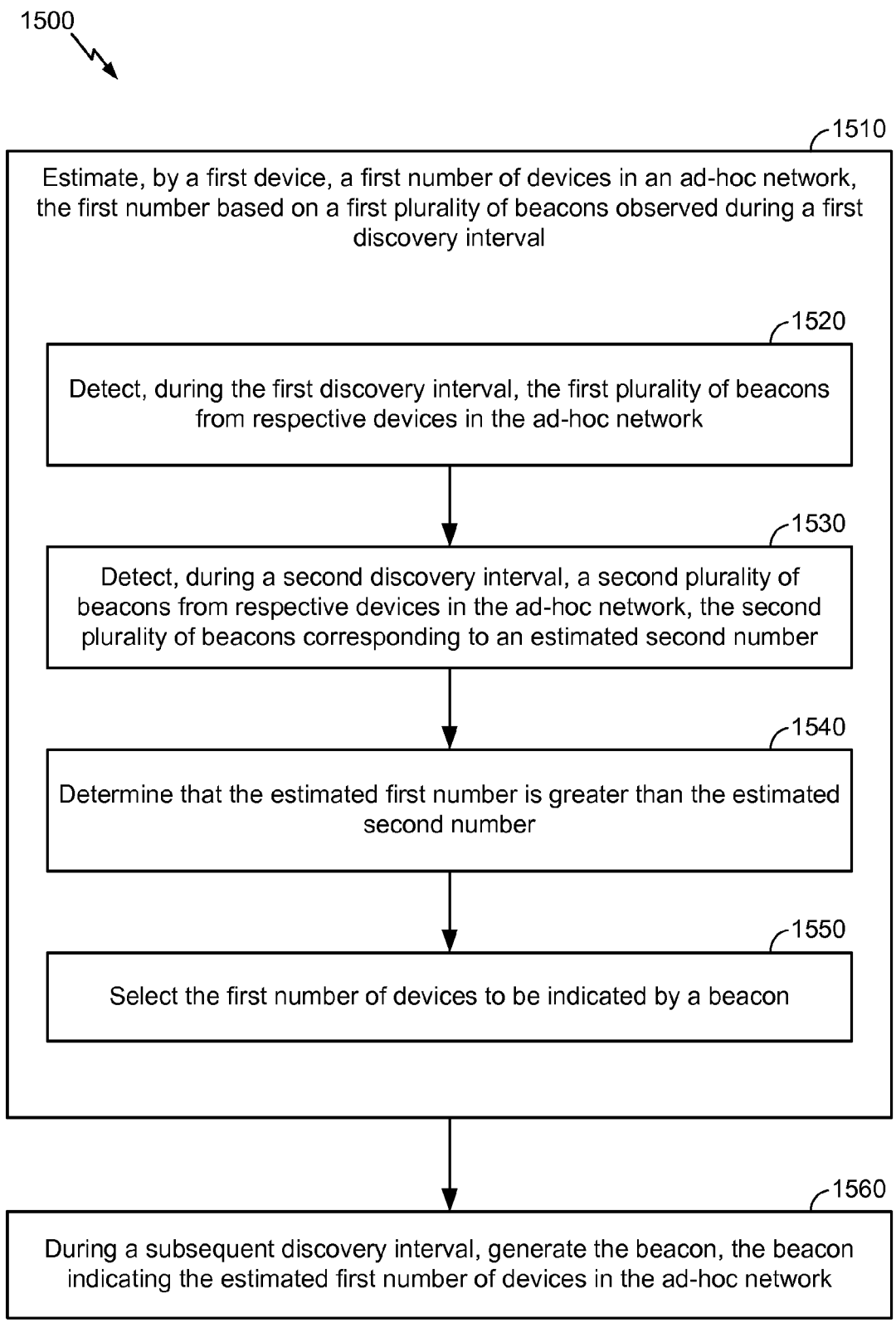
FIG. 15 depicts an example embodiment of a device, such as one of the devices of FIG. 1.

FIG. 15 depicts a flow chart of a particular embodiment of a method 1500 of operation of a device, such as the first device 110 of FIG. 1, the second device 120 of FIG. 1, the third device 130 of FIG. 1, or a combination thereof. The method 1500 may be performed within a network, such as the network 140 of FIG. 1. The network may be an ad-hoc wireless network.

The method 1500 includes estimating, by a first device, a first number of devices in an ad-hoc network, the first number based on a first plurality of beacons observed during a first discovery interval, at 1510. According to a particular illustrative embodiment, estimating the first number of devices in the ad-hoc network includes detecting, during the first discovery interval, the first plurality of beacons from respective devices in the ad-hoc network, at 1520. Estimating the first number of devices may further include detecting, during a second discovery interval, a second plurality of beacons from respective devices in the ad-hoc network, the second plurality of beacons corresponding to an estimated second number, at 1530. The first number of devices may be selected to be indicated by a beacon, at 1550, based on a determination that the estimated first number is greater than the estimated second number, at 1540. During a subsequent discovery interval, the beacon is generated, the beacon indicating the estimated first number of devices in the ad-hoc network, at 1560.

Thus, the method 1500 facilitates communication of an estimate of the number of devices in an ad-hoc network. The estimate of the number of devices in an ad-hoc network may enable other devices of the ad-hoc network to estimate a number of hidden devices in the ad-hoc network and may facilitate decision making regarding formation of new ad-hoc networks.

Figure 16:
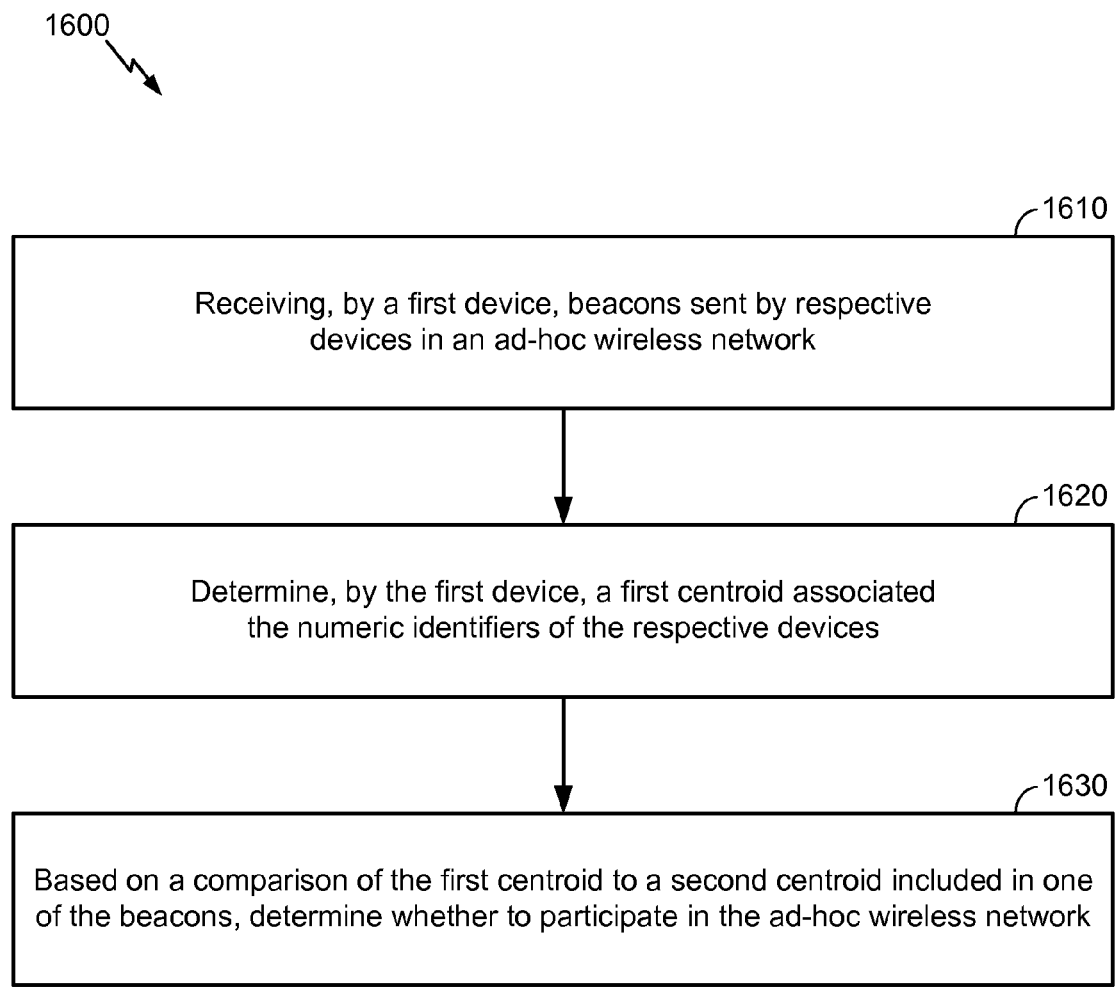
FIG. 16 depicts a first timeline and a second timeline depicting operations in an ad-hoc wireless network.

FIG. 16 depicts a flow chart of a particular embodiment of a method 1600 of operation of a device, such as the first device 160 of FIG. 1, the second device 120 of FIG. 1, the third device 130 of FIG. 1, or a combination thereof. The method 1600 may be performed within a network, such as the network 140 of FIG. 1. The network may be an ad-hoc wireless network.

The method 1600 includes receiving, at a first device, multiple beacons, each of the multiple beacons including a numeric identifier of a device that sent the beacon, at 1610. For example, the numeric identifiers may include media access control (MAC) addresses of the devices, such as the MAC address 835 of FIG. 8. The numeric identifiers may be stored and numerically sorted (e.g., from low to high), at 1620. The method 1600 further includes grouping the numeric identifiers into multiple subsets, including, for example, a first subset, at 1630. At 1640, respective centroids associated with the multiple subsets are determined. The respective centroids include at least one centroid associated with the first subset of the multiple subsets. The method 1600 further includes transmitting a beacon identifying at least the first centroid, at 1650.

The centroids may be determined by a mathematical process, such as deriving coordinates in a coordinate system based on the numeric identifiers and determining the centroid of a set of numeric identifiers based on the coordinates derived from the numeric identifiers. For example, a MAC address may be specified as a three sets of hexadecimal values, where each set of hexadecimal values includes four digits. In this example, each set of hexadecimal values may correspond to a position along an axis in a coordinate system (e.g., a three-dimensional coordinate system). Thus, the three sets of values of a first MAC address may specify coordinates of a particular location within the coordinate system. Several MAC addresses, e.g., one for each received beacon, may be mapped as locations within the coordinate system and the centroid may be determined as a centroid of the locations. Alternately or in addition, other methods of calculating the centroid may be used. For example, other numeric identifiers rather than or in addition to MAC addresses may be used. In another example, each digit of the MAC address may be used as a coordinate for a separate axis. In this example, each 12 digit hexadecimal MAC address may be mapped to a location in a twelve dimensional coordinate system.

Figure 17:
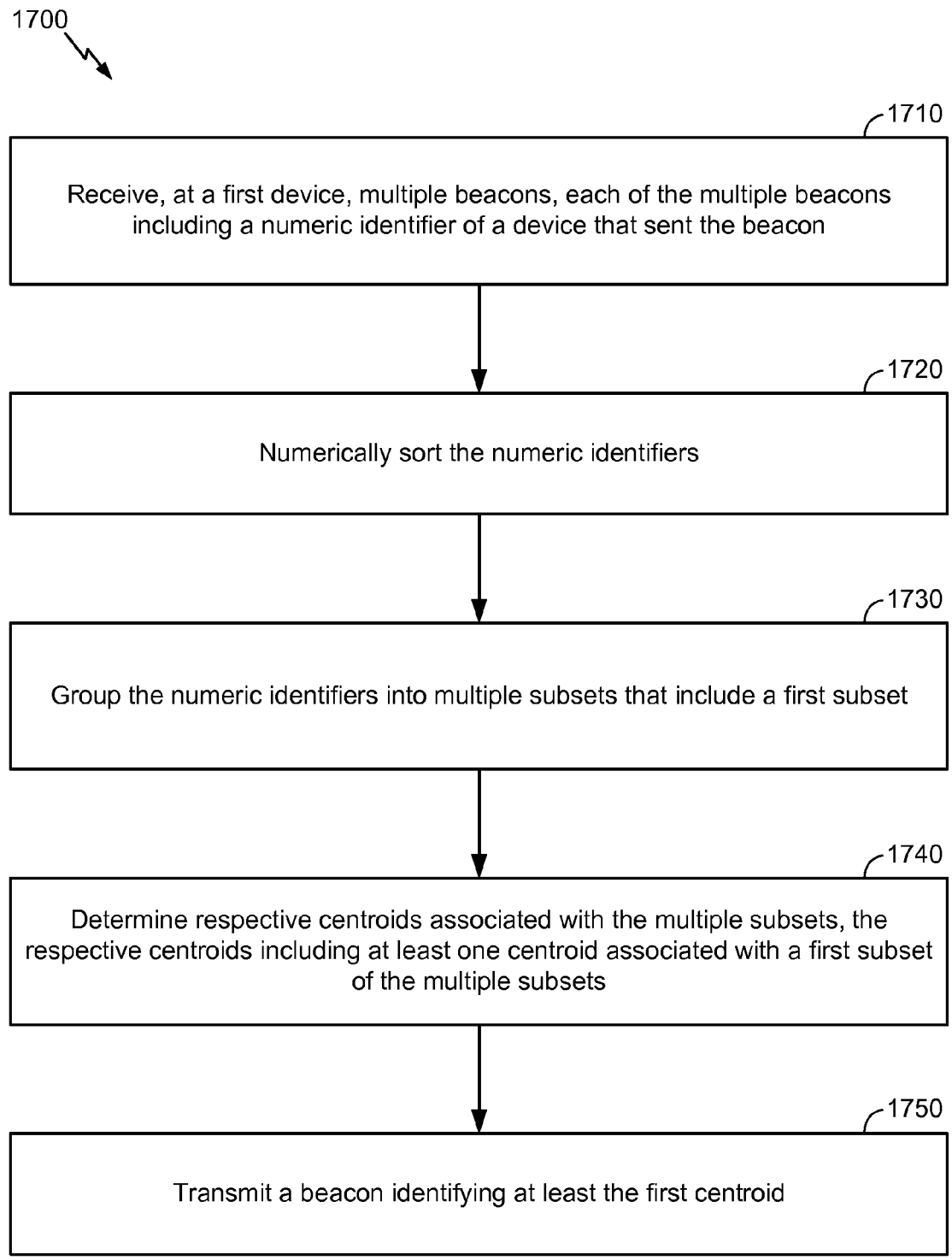
FIG. 17 depicts a flow chart of a particular embodiment of a method of operation of a device, such as one of the devices of FIG. 1.

Thus, a centroid transmitted in a beacon message provides an indication of other devices that are visible (i.e., not hidden from) a device that sent the beacon. A device that receives the centroid in a beacon may use the centroid to determine whether there are devices in the network that the device that sent the beacon can communicate with that the device that received the beacon cannot communication with. Therefore, the method 1600 enables devices of the ad-hoc network to estimate a number of hidden devices in the ad-hoc network and may facilitate decision making regarding formation of new ad-hoc networks FIG. 17 depicts a flow chart of a particular embodiment of a method 1700 of operation of a device, such as the first device 110 of FIG. 1, the second device 120 of FIG. 1, the third device 130 of FIG. 1, or a combination thereof. The method 1700 may be performed within a network, such as the network 140 of FIG. 1.

At 1710, a first device receives beacons sent by respective devices in an ad-hoc wireless network. The first device determines, at 1720, a first centroid associated the numeric identifiers of the respective devices. Based on a comparison of the first centroid to a second centroid included in one of the beacons, the first device determines whether to participate in the ad-hoc wireless network, at 1730. For example, the centroids may be determined as described with reference to the method 1600 of FIG. 16.

Figure 18:
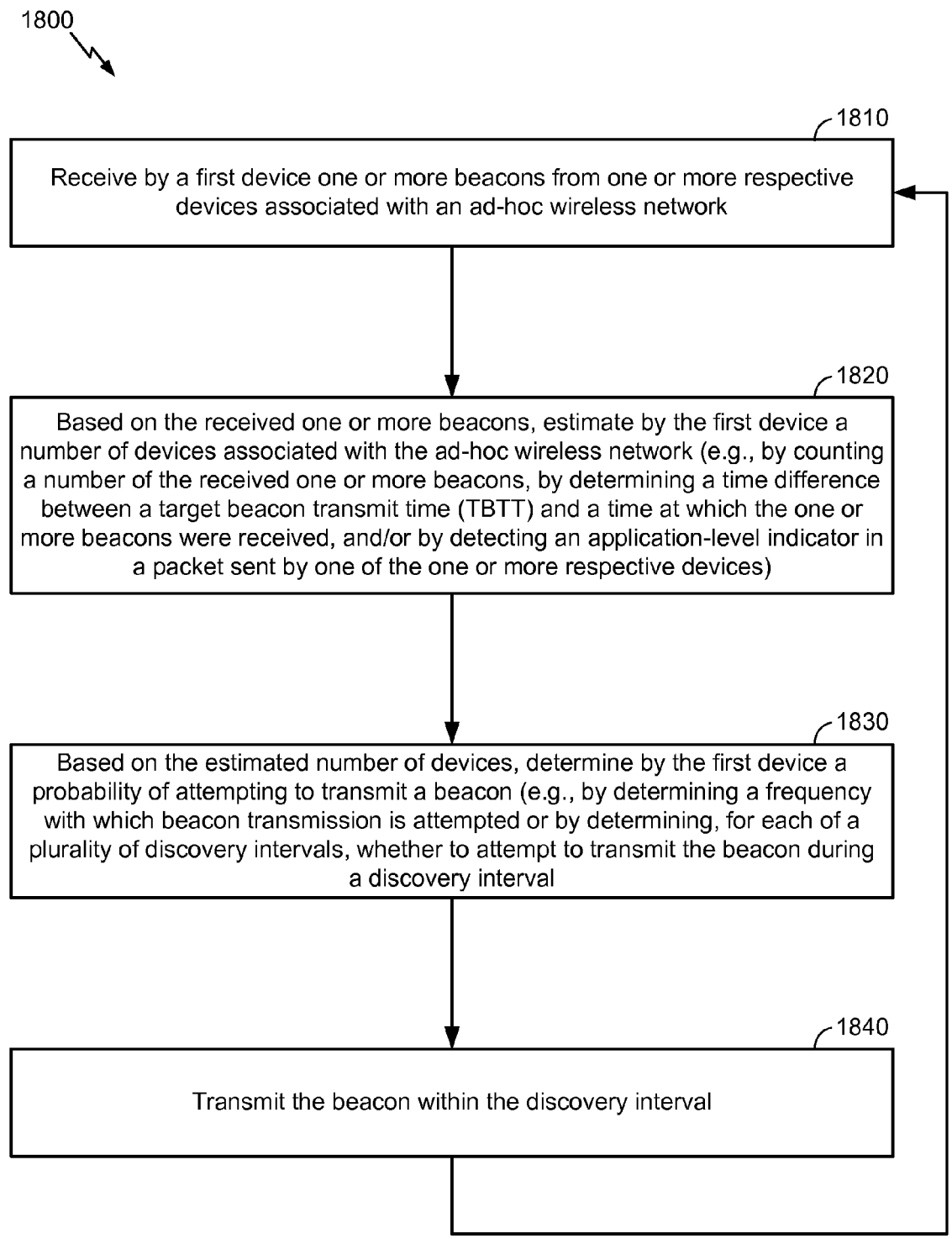
FIG. 18 depicts a flow chart of a particular embodiment of a method of operation of a device, such as one of the devices of FIG. 1.

FIG. 18 depicts a flow chart of a particular embodiment of a method 1800 of operation of a device, such as the first device 110 of FIG. 1, the second device 120 of FIG. 1, the third device 130 of FIG. 1, or a combination thereof. The method 1800 may be performed within a network, such as the network 140 of FIG. 1.

The method 1800 includes receiving by a first device (e.g., the first device 110 of FIG. 1) one or more beacons (e.g., one or more of the first discovery message 150 and the second discovery message 160 of FIG. 1) from one or more respective devices (e.g., one or more of the second device 120 and the third device 130 of FIG. 1), at 1810. The beacons are associated with an ad-hoc wireless network.

Based on the received one or more beacons, the first device estimates a number of devices, N, associated with the ad-hoc wireless network, at 1820. According to a first technique, the number of devices may be estimated by counting a number of the received one or more beacons to estimate the number of devices, N, in the ad-hoc wireless network. For example, the first device may access a look-up table of values. The look-up table of values may include a first value that corresponds to the estimated number of devices, N. The first device may use the first value to determine the probability of attempting to transmit the beacon in a discovery interval. In a particular illustrative embodiment, the first value is given by $\alpha(N)$, where $\alpha(N)$ is a value that varies with N. $\alpha(N)$ may vary non-linearly with respect to N. In at least one embodiment, the first device determines the probability according to $\alpha(N)/N$, where $\alpha(N)/N<1$.

According to a second technique, the first device may alternatively or in addition estimate the number of devices, N, based on a time difference between a scheduled or designated beacon transmit time, such as a target beacon transmit time (TBTT) (e.g., the TBTT 780 of FIG. 7), and a time when a beacon is actually received. The TBTT may begin at the beginning of a discovery interval, as described with reference to FIG. 7. The time difference may indicate the extent to which the received beacon was contended for, which is related to the number of devices in the ad-hoc wireless network.

According to a third technique, the first device may alternatively or in addition estimate the number of devices, N, by detecting one or more packets sent by one or more of the respective devices. For example, the first device may detect or "snoop" a packet sent by one of the devices. The packet may include data that can be used to approximate a number of devices in the ad-hoc wireless network. As an example, the packet may include an application-level indicator that indicates that the sending device is in the ad-hoc wireless network (e.g., an internet protocol (IP) address or a port number). The first device may detect a number of such packets from respective ones of the respective devices. Based on the detected packets, the first device may determine whether the estimated number of devices, N, in the ad-hoc wireless network is large enough that beacon contention should not occur during each discovery interval.

At 1830, based on the estimated number of devices, the first device determines a probability of attempting to transmit a beacon (i.e., a probability of attempting beacon contention) during a discovery interval. In at least a first embodiment, the first device uses the probability to determine a frequency with which the beacon is transmitted. For example, for a higher number of devices, N, the first device may determine to attempt beacon contention once every M discovery intervals, where M is an integer greater than one. In at least a second embodiment, the first device uses the probability to determine, for each of a plurality of discovery intervals, whether to transmit the beacon. For purposes of illustration, the first device may determine the probability of 0.25. For each of one or more subsequent discovery intervals, the first device may randomly or pseudo-randomly determine whether to attempt beacon contention based on the probability of 0.25, such as via random or pseudo-random number generation, such that for a given discovery interval the probability of attempting to transmit a beacon is 0.25. The method 1800 of FIG. 18 further includes transmitting the beacon within the discovery interval, at 1840 (e.g., as determined by the first embodiment or the second embodiment).

According to at least one embodiment, devices of the network may contend to transmit beacons when a size of the ad-hoc network is below a corresponding threshold, when the determined probability is greater than a corresponding threshold, or a combination thereof. For example, when the ad-hoc network includes fewer devices, each of the devices may attempt to transmit a beacon during each discovery interval. Such contention between devices may be acceptable while the ad-hoc network includes fewer devices (since, for example, a probability of two or more beacons colliding may be lower). As the number of devices in the ad-hoc network grows, devices may transmit beacons less frequently, for example, based on the determined probability. Such thresholds may vary by device (e.g., each device may autonomously determine whether the size of the ad-hoc network has increased such that the device should reduce the rate at which the device attempts beacon contention), reflecting the possibility that different devices in the network may observe the network to be different sizes (based on, for example, different device locations).

The method 1800 of FIG. 18 may be performed by the first device periodically or occasionally. For example, as depicted in FIG. 18, the method 1800 may reoccur, for example during a subsequent beacon interval. The first device may perform the method 1800 once for each beacon interval or once per multiple beacon intervals, for example to re-estimate the probability of transmitting the beacon to reflect that devices may have left or joined the ad-hoc wireless network.

Accordingly, the method 1800 of FIG. 18 enables dynamic estimation of the number of devices, N, in the ad-hoc wireless network. Further, because each particular device in the ad-hoc wireless network may independently (e.g., autonomously) estimate the size of the network as observed by the particular device, performance in the network can be improved, for example by reducing beacon contention by numerous devices in close proximity while enabling beacon contention where devices are fewer in number.

Figure 19:
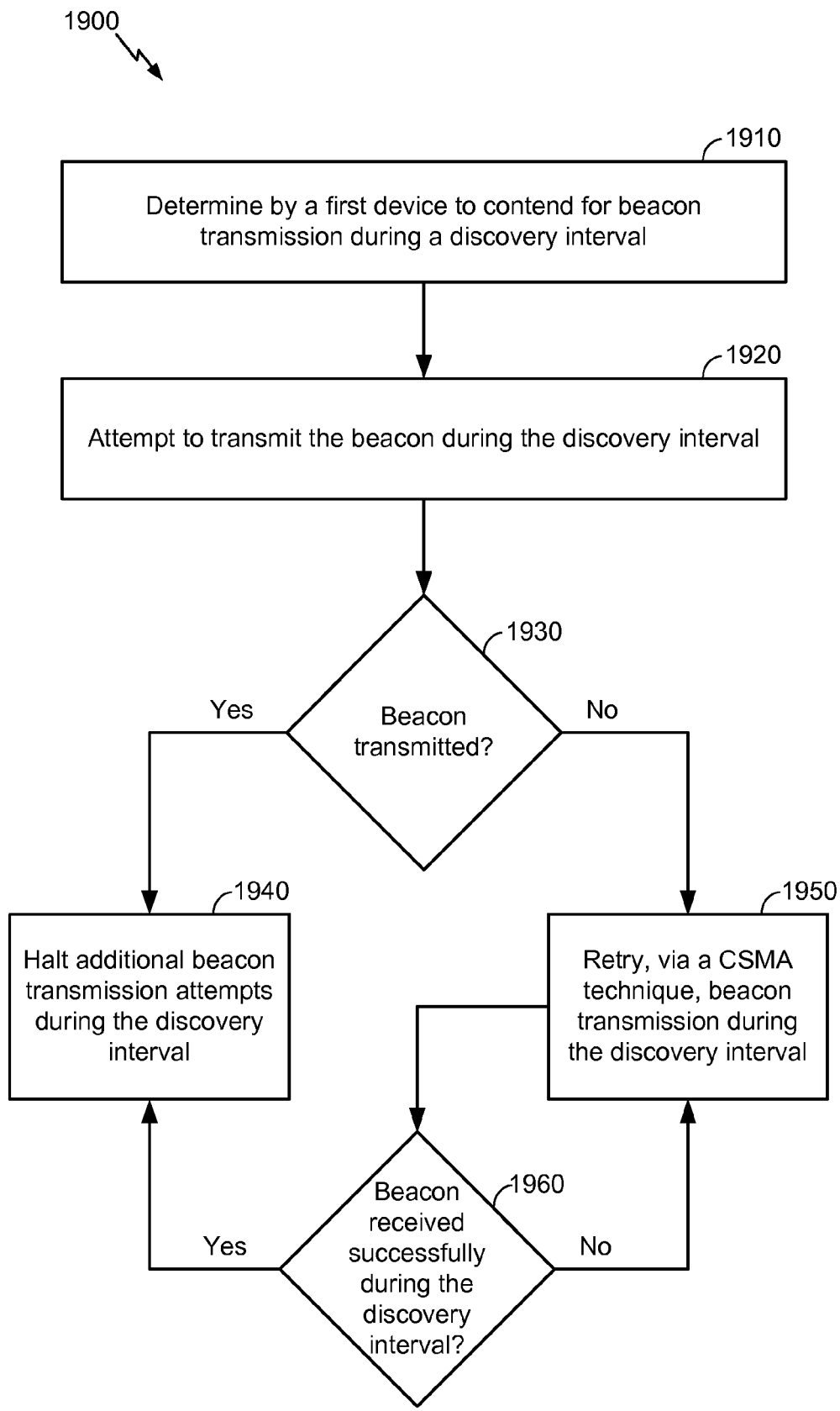
FIG. 19 depicts a flow chart of a particular embodiment of a method of operation of a device, such as one of the devices of FIG. 1.

FIG. 19 depicts a flow chart of a particular embodiment of a method 1900 of operation of a device, such as the first device 110 of FIG. 1, the second device 120 of FIG. 1, the third device 130 of FIG. 1, or a combination thereof. The method 1900 may be performed within a network, such as the network 140 of FIG. 1.

The method 1900 includes determining by a first device to contend for beacon transmission during a discovery interval, at 1910. For example, as described with reference to FIG. 18, the first device may use a probability to determine whether to attempt to transmit a beacon (i.e., contend for beacon transmission) during a particular discovery interval.

At 1920, transmission of the beacon is attempted during the discovery interval. As described above, for example with reference to FIG. 10, a time at which beacon transmission is attempted may be determined according to a back-off time interval and a start time. In at least one embodiment, beacon contention is performed using a carrier sense multiple access (CSMA) technique.

If the beacon is transmitted, at 1930, then the first device may halt additional beacon transmission attempts during the discovery interval, at 1940. If the beacon is not transmitted, at 1930, then the first device may retry beacon transmission during the discovery interval. Retrying the beacon transmission may be performed according to the CSMA technique.

In at least one embodiment, if a beacon is received successfully during the discovery interval at 1960 (i.e., from another device in the network), then the first device halts additional beacon transmission attempts during the discovery interval, at 1940. For example, in a network where beacons are utilized for synchronization (e.g., to synchronize clocks between devices in the network), a single beacon (here, the received beacon) may be sufficient for synchronization of devices in the network. In such a network, the first device may use the received beacon to synchronize an internal clock based on the received beacon (e.g., in order to synchronize subsequent communications within the network). If no beacon is successfully received during the discovery interval and beacon contention is unsuccessful during the discovery interval, the first device may await a subsequent discovery interval to resume beacon contention. In addition, based on the unsuccessful beacon contention, the first device may determine that the estimated size of the network is sufficiently large that beacon contention should not be attempted each discovery interval. Accordingly, devices operating accordance with the method 1900 of FIG. 19 may efficiently use network resources and reduce instances of beacon collisions.

Methods and operations described herein, such as the methods described with reference to FIGS. 3, 4, and 10-19, may be implemented by hardware, by hardware that processes instructions (e.g., software) stored on a computer-readable medium, or using both hardware and instructions. For example, methods and operations described herein may be implemented using a field-programmable gate array (FPGA) device, an application-specific integrated circuit (ASIC), a processing unit such as a central processing unit (CPU), a digital signal processor (DSP), a controller, another hardware device, firmware device, or any combination thereof. Examples of such hardware and instructions are described further with reference to FIG. 20.

Figure 20:
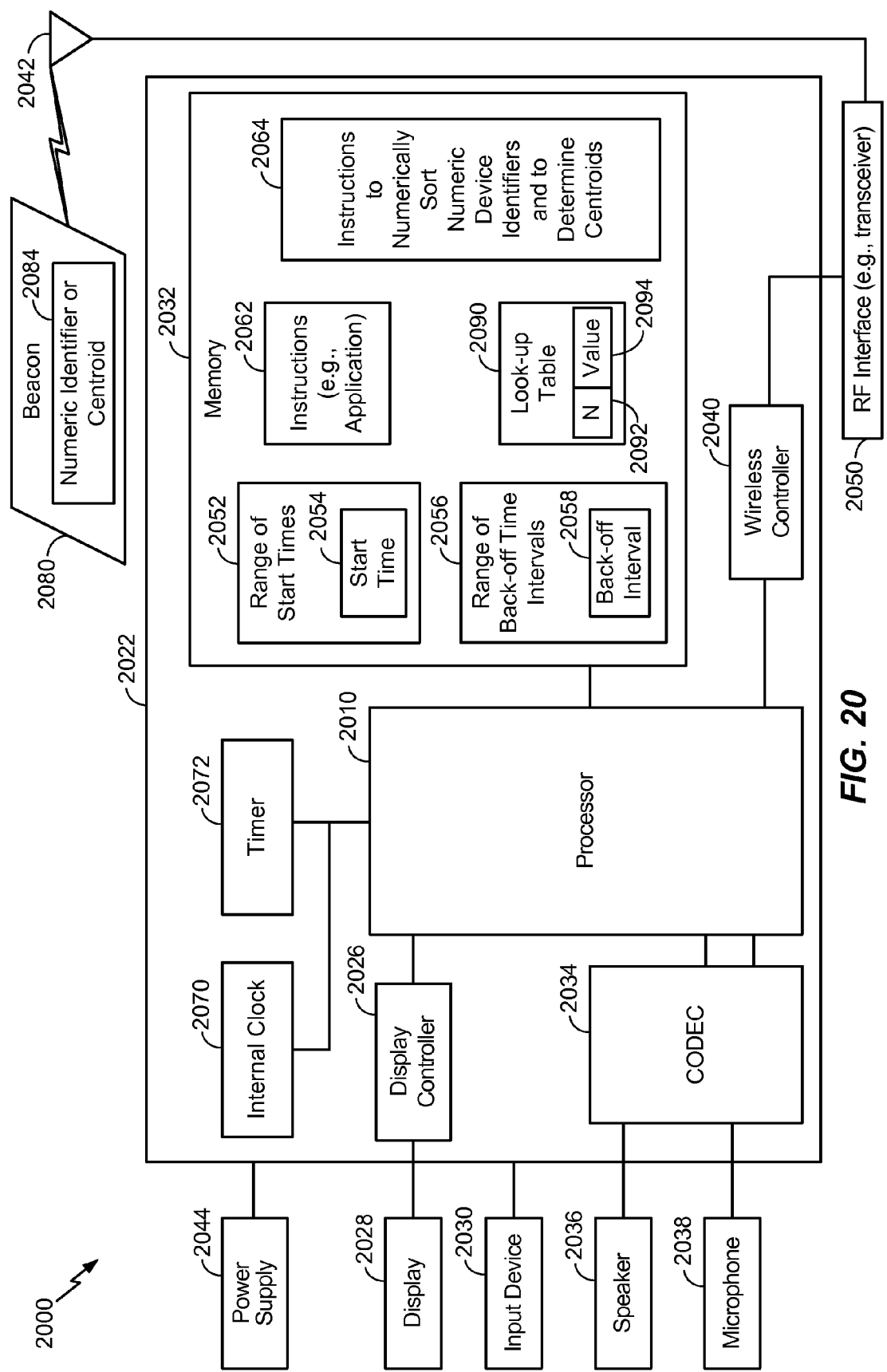
FIG. 20 depicts a particular illustrative embodiment of a device, such as one of the devices of FIG. 1.

Referring to FIG. 20, a block diagram of a particular illustrative embodiment of a device is depicted and generally designated 2000. In the particular illustrative embodiment depicted in FIG. 20, the device 2000 is a mobile device (e.g., a wireless communication device.) According to alternate embodiments, the device 2000 may be another device in a network, such as the network 140, which may be an ad-hoc wireless network.

The device 2000 includes a processor 2010, such as a digital signal processor (DSP), which may execute suitable instructions, such as instructions stored at a memory 2032. For example, the memory 2032 may include instructions 2062 corresponding to one or more applications supported by the device 2000. Further, the memory 2032 may include instructions 2064 executable by the processor 2010 to numerically sort numeric device identifiers and to determine centroids associated with the numeric device identifiers, as described with reference to FIG. 16 and as further described below.

The memory 2032 may further include data or instructions 2052 corresponding to a range of start times (e.g., the range of start times described with reference to FIG. 7). The data or instructions 2052 may include a start time 2054, which may be the start time 760 of FIG. 7. The memory 2032 may further include data or instructions 2056 corresponding to a range of back-off time intervals. The data or instructions 2056 may include a back-off time interval 2058, which may be the back-off time interval 770 of FIG. 7.

The memory 2032 may further include a look-up table 2090. The look-up table 2090 may include one or more values, such as a representative value 2094. The value 2094 may be the value $\alpha(N)$ described with reference to FIG. 18. Values of the look-up table 2090 may be indexed. For example, in the embodiment of FIG. 20, the value 2094 is indexed via a representative corresponding index value 2092. The index value 2092 may be the estimated number of devices, N, described with reference to FIGS. 18 and 19.

FIG. 20 also depicts that the device 2000 includes an internal clock 2070, a timer 2072, and a display controller 2026 each coupled to the processor 2010. The display controller 2026 is further coupled to a display 2028. A coder/decoder (CODEC) 2034 may also be coupled to the processor 2010. A speaker 2036 and a microphone 2038 may be coupled to the CODEC 2034.

FIG. 20 also depicts that a wireless controller 2040 can be coupled to the processor 2010, to a radio frequency (RF) interface 2050 (e.g., a transceiver), and to an antenna 2042. The device 2000 may further include an input device 2030 and a power supply 2044.

The processor 2010, the display controller 2026, the CODEC 2034, the wireless controller 2040, the memory 2032, the internal clock 2070, and the timer 2072 may be included in a system-in-package or system-on-chip device 2022. Moreover, in a particular embodiment and as illustrated in FIG. 20, the display 2028, the input device 2030, the speaker 2036, the microphone 2038, the antenna 2042, the RF interface 2050, and the power supply 2044 are external to the system-on-chip device 2022. However, each of the display 2028, the input device 2030, the speaker 2036, the microphone 2038, the antenna 2042, the RF interface 2050, and the power supply 2044 can be coupled to a component of the system-on-chip device 2022, such as to an interface or a controller.

In at least one embodiment, the timer 2072 is configured to count, beginning at the start time 2054 (as determined by, e.g., the internal clock 2070), the back-off time interval 2058. At the expiration of the back-off time interval 2058, a beacon may be transmitted, e.g., via the RF interface 2050 and the antenna 2042, which may be received by other devices.

In at least one embodiment, the data or instructions 2064 are executable by the processor 2010 to determine a centroid associated with devices in an ad-hoc network. For example, the device 2000 may receive discovery messages, such as a beacon 2080. Each of the multiple beacons may include a numeric identifier (e.g., a numeric identifier 2084) of a device that sent the beacon 2080. The device 2000 may numerically sort the numeric identifiers, group the numeric identifiers into multiple subsets, and determine respective centroids associated with the multiple subsets. The centroids determined by the device 2000 may be compared to centroids received from other devices to determine an estimated number of "hidden" devices in the network. Similarly, the centroids determined by the device 2000 may be transmitted (e.g., via a beacon) to other devices (e.g., so the other devices can determine whether to join the ad-hoc network).

In at least one embodiment, the memory 2032 of the device 2000 includes instructions executable by the processor 2010 to operate in accordance with the method 1800 of FIG. 18, with the method 1900 of FIG. 19, or a combination thereof. For example, the device 2000 may execute instructions stored at the memory 2032 to receive beacons and to estimate a number of devices, N, in the network, as described with reference to FIG. 18. The device 2000 may find in the look-up table 2090 a corresponding value (such as the value 2094) that corresponds to the estimated number of devices, N, in the network. The device 2000 may use the value 2094 to determine a probability of attempting to transmit a beacon, as described with reference to FIG. 18. For example, the device 2000 may divide the value 2094 by the index value 2092 (corresponding to $\alpha(N)/N$ as described with reference to FIG. 18) to determine a probability of attempting to transmit a beacon. As will be appreciated, values of the look-up table 2090 may be determined by the device 2000 or may be standardized in accordance with a wireless communication protocol. Similarly, the values of the look-up table 2090 may be updated, for example as the device 2000 gathers more information about the network.

Figure 21:
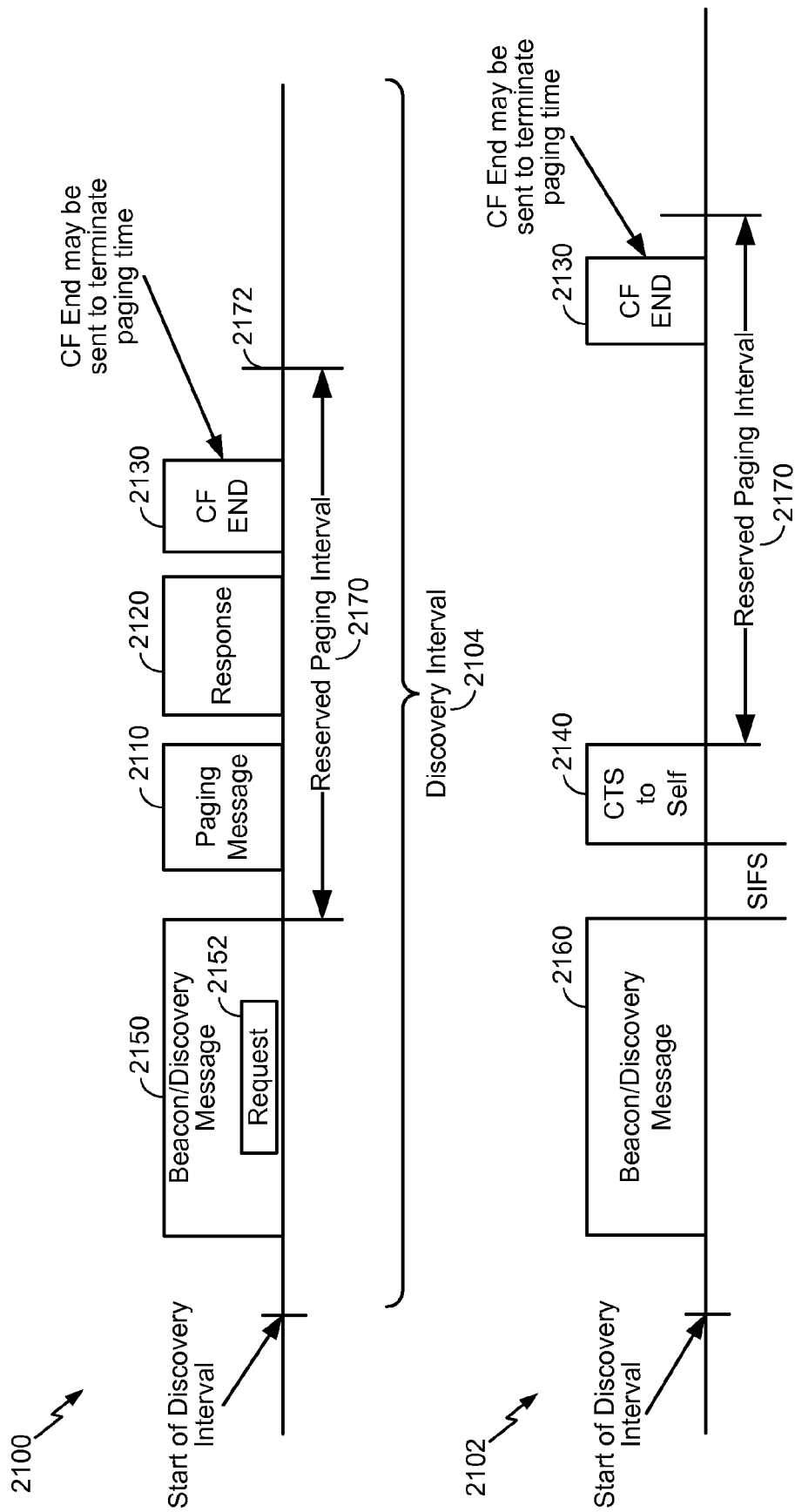
FIG. 21 depicts example timelines associated with a network, such as the network of FIG. 1.

FIG. 21 depicts an example first timeline 2100 illustrating communications between devices (e.g., the first device 110 of FIG. 1, the second device 120 of FIG. 1, the third device 130 of FIG. 1, or a combination thereof) of the network 140, which may be an ad-hoc wireless network. As shown in FIG. 21, the example first timeline 2100 includes a discovery interval 2104. Certain features of FIG. 21 may be described with reference to FIG. 7. For example, the discovery interval 2104 may be the first discovery interval 710 of FIG. 7, the second discovery interval 720 of FIG. 7, or a combination thereof.

A discovery message 2150 (e.g., a beacon) may be transmitted during the discovery interval 2104. The discovery message 2150 may include a request 2152 to reserve a paging interval 2170 during which paging messages (such as a representative paging message 2110) may be sent and received by devices of the ad-hoc wireless network. In at least one embodiment and as discussed further below, the request 2152 may be included in an information element (IE) included in (or appended to) the discovery message 2150. In at least one embodiment, the request 2152 may be included in a duration field of the discovery message 2150.

The paging message 2110 may be sent by a first device in response to the request 2152. In at least one embodiment, the first device sends the paging message 2110 requesting service information from a second device in the ad-hoc wireless network. For example, the paging message 2110 may request service information that identifies a start of a service offered by the second device, details associated with services offered by the device, or a combination thereof. One example of a service is a gaming application that enables multi-player interaction via the ad-hoc wireless network, social networking communication via the ad-hoc wireless network, and the like. Further, the request 2152 may indicate a time at which the first device will be available to be paged (if applicable). For example, the time may be indicated as an offset from a start time of the beginning of the discovery interval 2104. Further, the request 2152 may indicate that the first device will be available to be paged periodically at a particular time (e.g., at a particular time during one or more subsequent discovery intervals).

After receiving the paging message 2110 from the first device, the second device may transmit a response 2120. The response 2120 may include the service information requested by the paging message 2110. Alternately or in addition, the response 2120 may acknowledge the paging message 2110 and may indicate a subsequent time when the second device will send the requested service information. The subsequent time may be during the paging interval 2170, after the paging interval 2170 but during the discovery interval 2104, or during a subsequent discovery interval.

As shown in FIG. 21, the request 2152 reserves the paging interval 2170, during which the devices of the ad-hoc wireless network may send and receive pages. In the example first timeline 2100 of FIG. 21, the reserved paging interval 2170 begins at the end of the discovery message 2150. Further, the reserved paging interval 2170 may end at a predetermined time (e.g., at a predetermined end time 2172). However, as described further below, a device of the ad-hoc wireless network, such as the first device that sent the paging message 2110, may choose to terminate the reserved paging interval 2170 prior to the predetermined end time 2172. For example, as shown in the example first timeline 2100, the device may end the reserved paging interval 2170 by transmitting an end message, such as a contention frame (CF) end message 2130. The end message may cause devices of the ad-hoc wireless network to terminate paging contention during the reserved paging interval 2170.

FIG. 21 further depicts an example second timeline 2102 where the reserved paging interval 2170 begins after a first device in the ad-hoc wireless network transmits a clear to send (CTS) to self message 2140 (e.g., a CTS message sent from the first device to the first device). For example, after the first device transmits the discovery message 2150, a device (e.g., the first device or another device) in the ad-hoc wireless network may transmit the CTS to self message 2140 indicating that the reserved paging interval 2170 is to begin. As discussed with reference to the example first timeline 2100, the reserved paging interval 2170 may end at the predetermined end time 2172 or may end in response to the CF end message 2130.

It should be appreciated that the embodiments described with reference to FIG. 21 enable efficient paging between devices in the ad-hoc wireless network. For example, because devices in the ad-hoc wireless network are generally awake (e.g., in order to transmit and/or receive beacons) during at least a portion of the discovery interval 2104, it may be advantageous to indicate to the devices when paging will occur to avoid paging of sleeping devices and to allow devices to sleep without missing pages. Further, once a discovery message is successfully transmitted (namely, the discovery message 2150), the remainder of the discovery interval 2104 may not be used to transmit additional discovery messages in some networks, Accordingly, efficient use of the remainder of the discovery interval 2104 may be made by reserving paging interval 2170 in the remainder of the discovery interval 2104.

Figure 22:
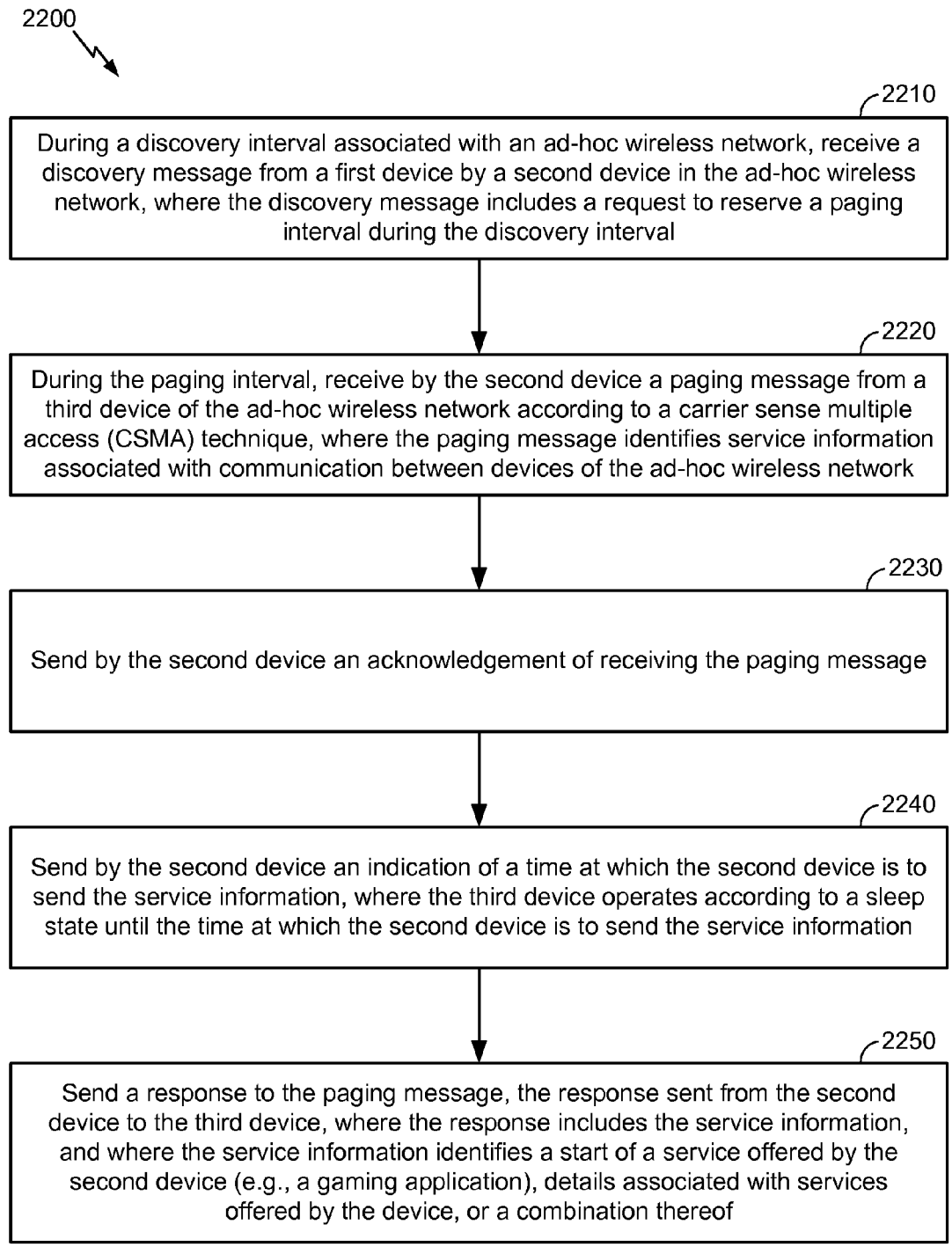
FIG. 22 depicts a flow chart of a particular embodiment of a method of operation of a device, such as one of the devices of FIG. 1.

FIG. 22 depicts a flow chart of a particular embodiment of a method 2200 of operation of a device, such as the first device 110 of FIG. 1, the second device 120 of FIG. 1, the third device 130 of FIG. 1, or a combination thereof. The method 2200 may be performed within a network, such as the network 140 of FIG. 1.

The method 2200 includes receiving, during a discovery interval associated with an ad-hoc wireless network, a discovery message from a first device by a second device in the ad-hoc wireless network, at 2210. The discovery message includes a request to reserve a paging interval during the discovery interval, such as the reserved paging interval 2170 of FIG. 21. The first device may send the request in response to determining that the first device is to page another device or is to be paged by another device. In a particular embodiment, any device of the ad-hoc wireless network may page any other devices of the ad-hoc wireless network during the paging interval.

At 2220, the second device receives a paging message from a third device of the ad-hoc wireless network during the paging interval. To avoid collisions, the third device may send the paging message during the paging interval according to a carrier sense multiple access (CSMA) technique. The paging message may request service information associated with communication between devices of the ad-hoc wireless network, such as the service information described with reference to FIG. 21.

After receiving the paging message from the third device, the second device may send a response to the third device. For example, the second device may send, at 2230, an acknowledgement of receiving the paging message to the third device. Alternatively or in addition, if the second device is busy or is experiencing delays (e.g., due to resource-intensive processing tasks), the second device may send, at 2240, an indication of a time at which the second device is to send the service information to the third device. The third device may then operate according to a sleep state until the time at which the second device is to send the service information.

In another example, the second device may send a response to the paging message, at 2250. In a particular embodiment, when the second device indicated a time at which the second device would send the service information (at 2240), the response may be send at the indicated time. The response includes the service information. According to at least one embodiment, the service information identifies a start of a service offered by the second device (e.g. a gaming application), details associated with services offered by the device (e.g., details of the gaming application), or a combination thereof. Accordingly, the method 2200 of FIG. 22 may enable efficient paging between devices of the ad-hoc wireless network.

Figure 23:
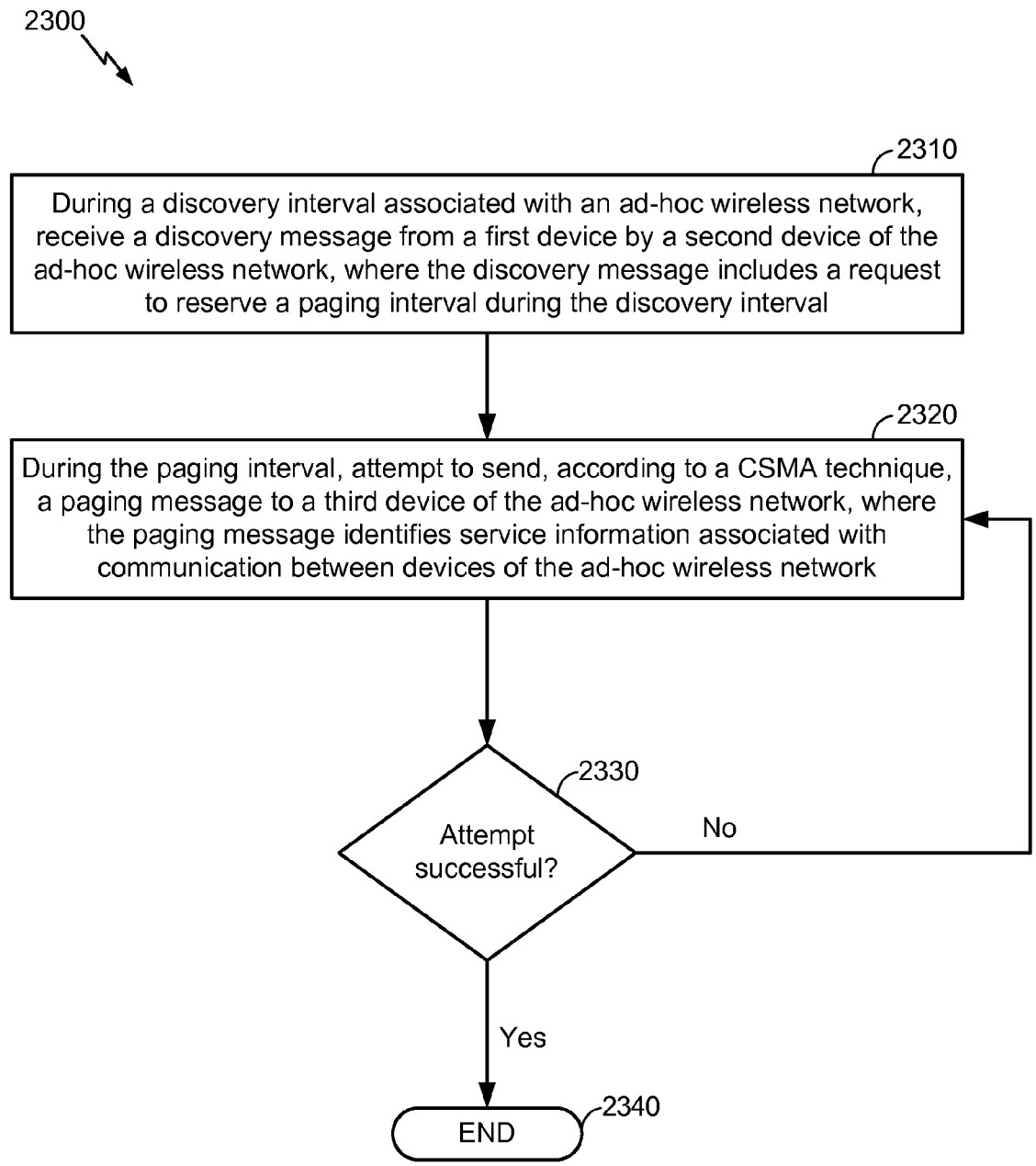
FIG. 23 depicts a flow chart of a particular embodiment of a method of operation of a device, such as one of the devices of FIG. 1.

FIG. 23 depicts a flow chart of a particular embodiment of a method 2300 of operation of a device of an ad-hoc wireless network, such as the first device 110 of FIG. 1, the second device 120 of FIG. 1, the third device 130 of FIG. 1, or a combination thereof. The method 2300 may be performed within a network, such as the network 140 of FIG. 1.

The method 2300 includes receiving a discovery message from a first device during a discovery interval associated with an ad-hoc wireless network, at 2310. The discovery message is received by a second device of the ad-hoc wireless network. The discovery message includes a request to reserve a paging interval during the discovery interval.

At 2320, during the paging interval, the second device may attempt to send a paging message to another device of the ad-hoc wireless network, such as the first device or a third device. The paging message requests service information associated with communication between devices of the ad-hoc wireless network.

The second device may use a CSMA technique to send the paging message. For example, the second device may select a random or pseudorandom start time during the paging interval to start a back-off countdown. The second device may also select a random or pseudorandom back-off time. At the start time, the second device may start the back-off countdown. If another transmission is detected on a transmission medium during the back-off countdown, the second device may abort transmission of the paging message, referred to herein as a failed attempt to transmit the paging message. If no transmission is detected on the transmission medium during the back-off countdown, the second device may send the paging message at expiration of the back-off countdown, referred to herein as a successful attempt to transmit the paging message. At 2330, a determination is made whether the attempt is successful. If the attempt is not successful, the second device may retry sending the paging message, at 2320. If at 2330 it is determined that the attempt was successful, the method 2300 may terminate, at 2340.

Figure 24:
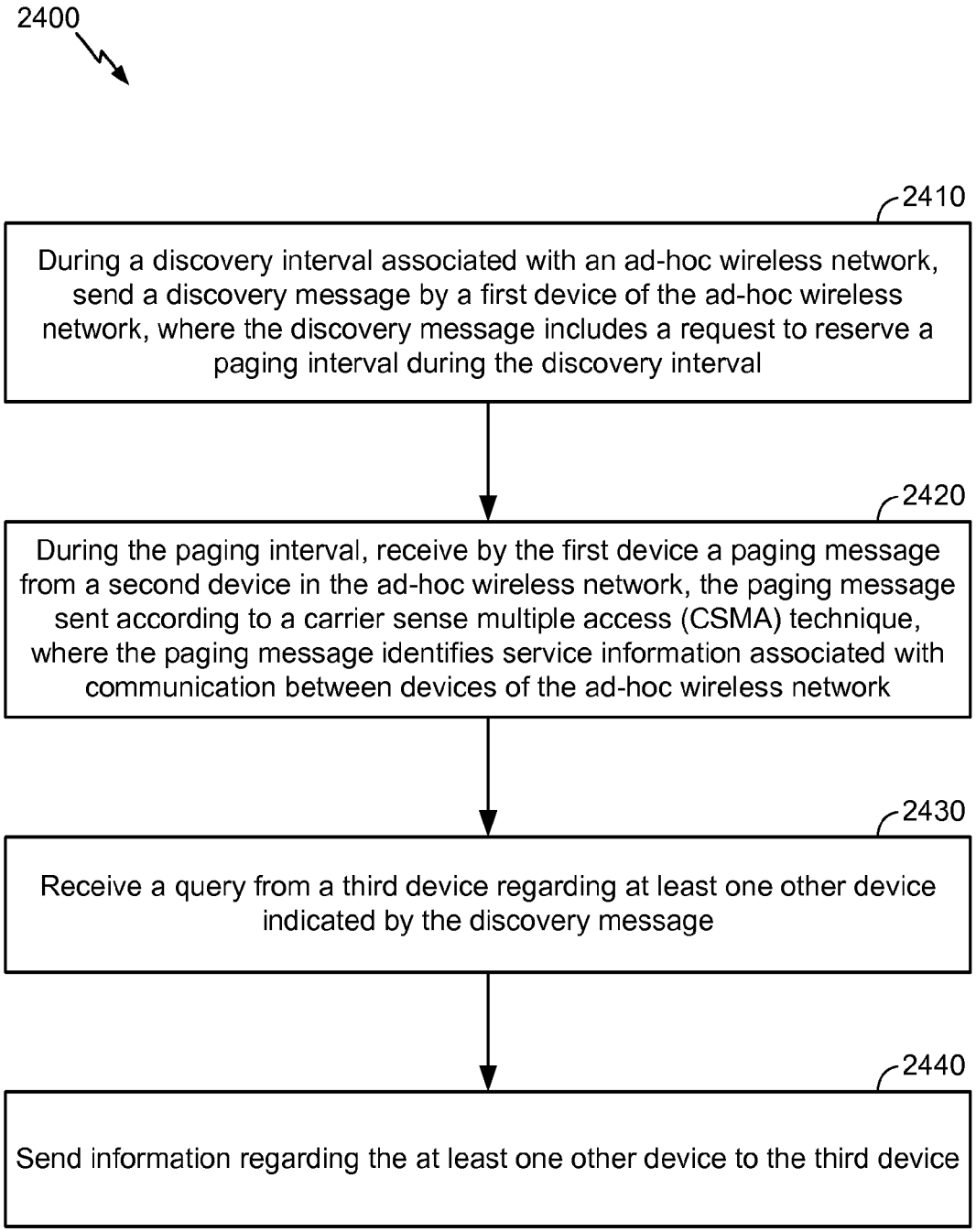
FIG. 24 depicts a flow chart of a particular embodiment of a method of operation of a device, such as one of the devices of FIG. 1.

FIG. 24 depicts a flow chart of a particular embodiment of a method 2400 of operation of a device of an ad-hoc wireless network, such as the first device 110 of FIG. 1, the second device 120 of FIG. 1, the third device 130 of FIG. 1, or a combination thereof. The method 2400 may be performed within a network, such as the network 140 of FIG. 1.

At 2410, during a discovery interval associated with the ad-hoc wireless network, a first device of the ad-hoc wireless network sends a discovery message. The discovery message includes a request to reserve a paging interval during the discovery interval.

At 2420, during the paging interval, the first device receives a paging message from a second device in the ad-hoc wireless network. The second device may send the paging message according to a CSMA technique. Utilizing the CSMA technique for sending paging messages may decrease the probability of collisions between paging messages sent from multiple devices of the ad-hoc wireless network. The paging message requests service information associated with communication between devices of the ad-hoc wireless network.

In a particular embodiment, the discovery message may include information indicating that the first device has information associated with other devices or services of the ad-hoc wireless network. At 2430, the first device receives a query from a third device regarding at least one other device indicated by the discovery message. The first device sends the information regarding the at least one other device to the third device, at 2440.

Figure 25:
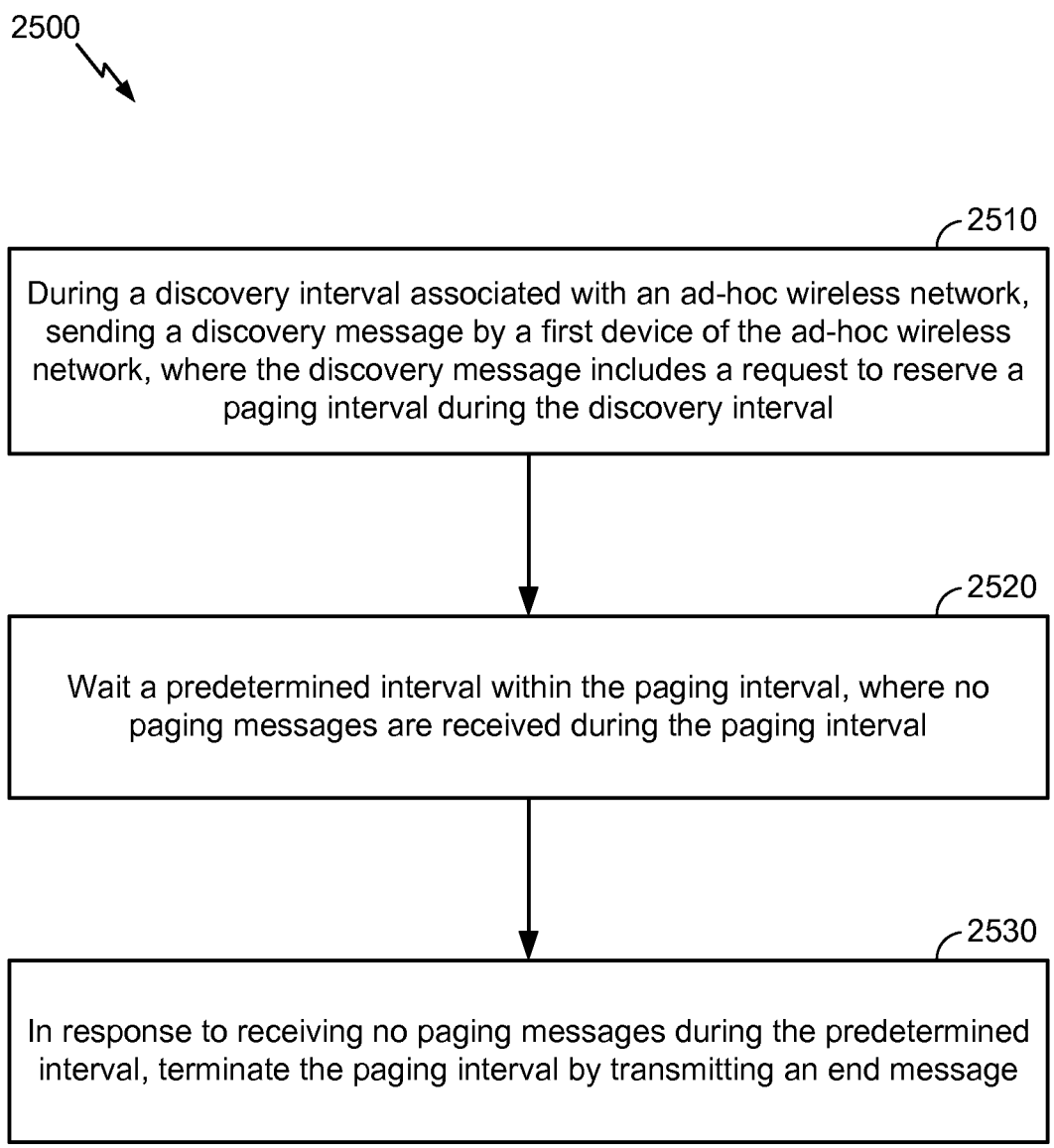
FIG. 25 depicts a flow chart of a particular embodiment of a method of operation of a device, such as one of the devices of FIG. 1.

FIG. 25 depicts a flow chart of a particular embodiment of a method 2500 of operation of a device of an ad-hoc wireless network, such as the first device 110 of FIG. 1, the second device 120 of FIG. 1, the third device 130 of FIG. 1, or a combination thereof. The method 2500 may be performed within a network, such as the network 140 of FIG. 1.

During a discovery interval associated with the ad-hoc wireless network, a first device of the ad-hoc wireless network sends a discovery message, at 2510. The discovery message includes a request to reserve a paging interval during the discovery interval.

At 2520, the first device waits a predetermined interval within the paging interval. As shown in FIG. 25, if no paging messages are received during the predetermined interval, the first device may terminate the predetermined interval by transmitting an end message, such as the CF end message 2130 of FIG. 21, at 2530.

The method 2500 of FIG. 25 may enable efficient use of resources in the ad-hoc wireless network. For example if few or no paging messages are being received during the paging interval, it may be assumed that either the ad-hoc wireless network includes few devices or that few devices in the ad-hoc wireless network are attempting to page other devices. Thus, the paging interval may be terminated prior to a predetermined end time (such as the predetermined end time 2172 of FIG. 21) of the paging interval.

Figure 26:
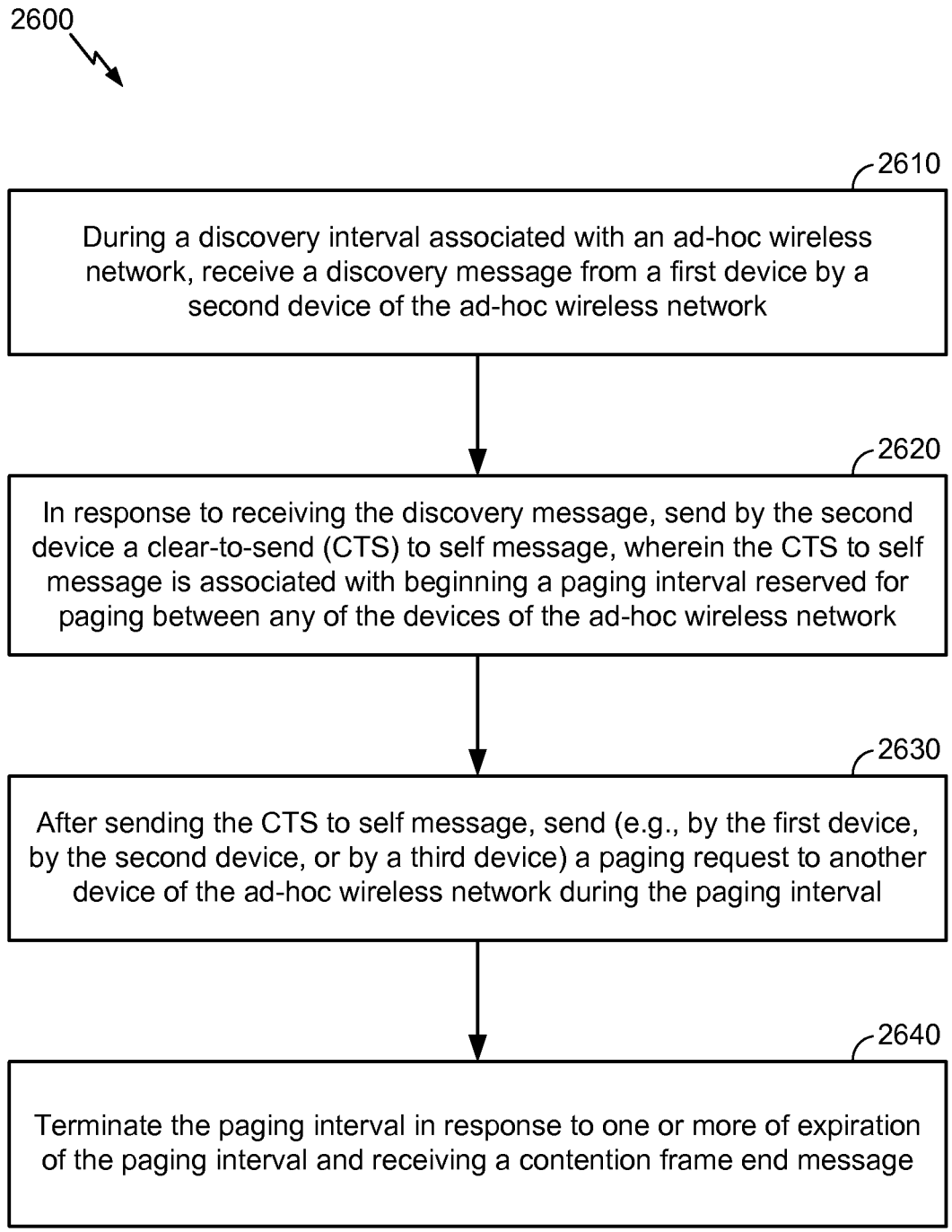
FIG. 26 depicts a flow chart of a particular embodiment of a method of operation of a device, such as one of the devices of FIG. 1.

FIG. 26 depicts a flow chart of a particular embodiment of a method 2600 of operation of a device of an ad-hoc network, such as the first device 110 of FIG. 1, the second device 120 of FIG. 1, the third device 130 of FIG. 1, or a combination thereof. The method 2600 may be performed within a network, such as the network 140 of FIG. 1.

At 2610, during a discovery interval associated with an ad-hoc wireless network, the method 2600 includes receiving a discovery message from a first device by a second device of the ad-hoc wireless network. At 2620, in response to receiving the discovery message, the second device sends a clear-to-send (CTS) to self message. The CTS to self message may be the CTS to self message 2140 of FIG. 21 and may indicate to other devices that a paging interval reserved for paging between any of the devices of the ad-hoc wireless network is to begin. Accordingly, the CTS to self message may indicate one or more of a begin time of the paging interval, a duration of the paging interval, and an end of the paging interval. Alternatively or in addition, the paging interval may automatically begin in response to sending the CTS to self message.

At 2630, after sending the CTS to self message, a device (such as the first device, the second device, or a third device) sends a paging request to another device of the ad-hoc wireless network during the paging interval. The method 2600 may further include receiving a response to the paging request from the other device. At 2640, the paging interval is terminated in response to one or more of expiration of the paging interval (e.g., reaching the predetermined end time 2172 of FIG. 21) and receiving an end message, such as the CF end message 2130 of FIG. 21. Devices in the ad-hoc wireless network may use the CTS to self message to efficiently reserve a paging interval for paging communications between network devices.

Figure 27:
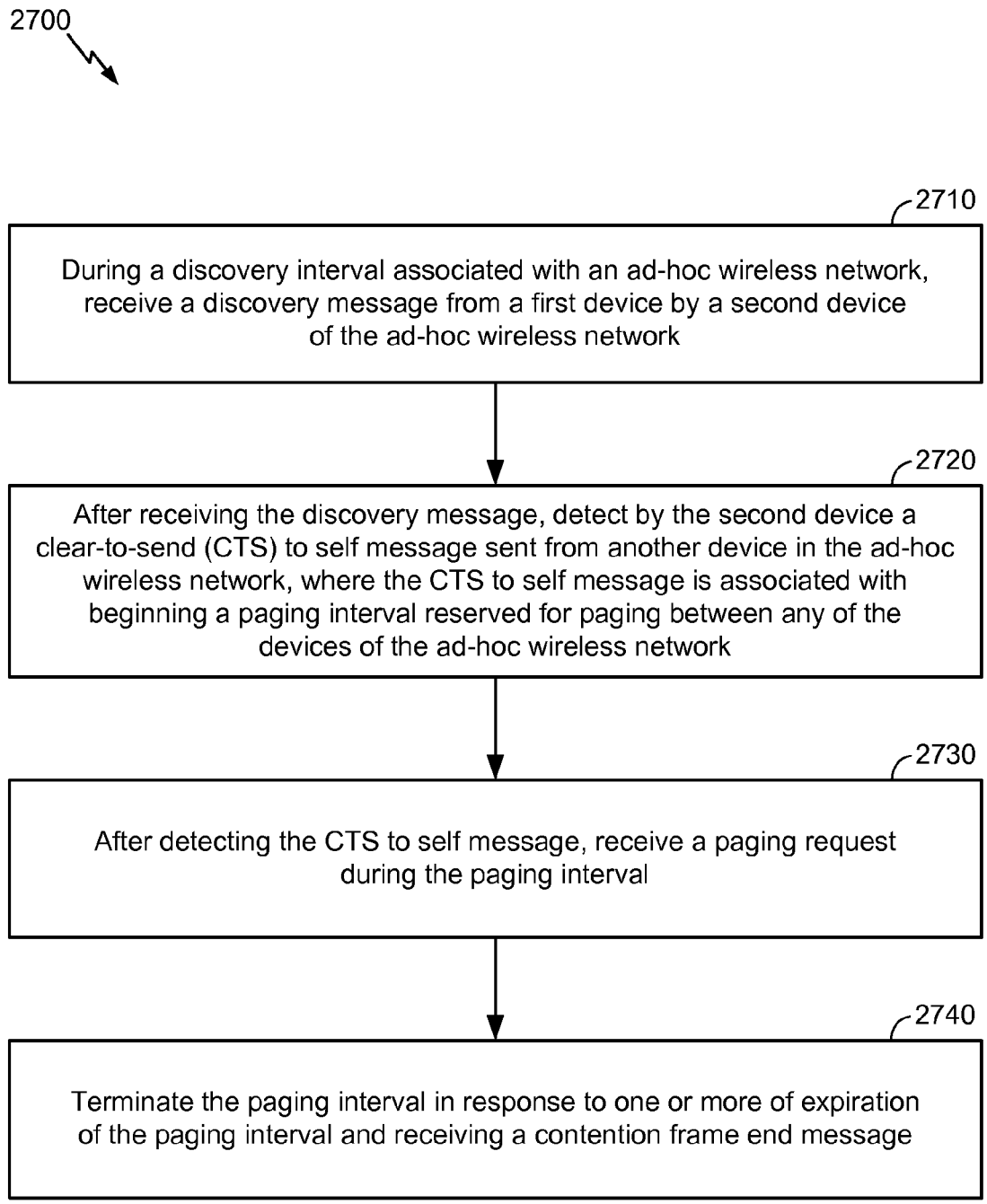
FIG. 27 depicts a flow chart of a particular embodiment of a method of operation of a device, such as one of the devices of FIG. 1.

FIG. 27 depicts a flow chart of a particular embodiment of a method 2700 of operation of a device of an ad-hoc wireless network, such as the first device 110 of FIG. 1, the second device 120 of FIG. 1, the third device 130 of FIG. 1, or a combination thereof. The method 2700 may be performed within a network, such as the network 140 of FIG. 1.

At 2710, during a discovery interval associated with the ad-hoc wireless network, the method 2700 includes receiving a discovery message from a first device by a second device of the ad-hoc wireless network. At 2720, after receiving the discovery message, the second device may detect a clear-tosend (CTS) to self message sent from another device (such as the first device or a third device) in the ad-hoc wireless network. The CTS to self message is associated with beginning a paging interval reserved for paging between any of the devices of the ad-hoc wireless network.

At 2730, after detecting the CTS to self message, the second device receives a paging request during the paging interval. After receiving the paging request, the second device may respond to the paging request. At 2740, the paging interval may be terminated in response to one or more of expiration of the paging interval (e.g., reaching the predetermined end time 2172 of FIG. 21) and receiving an end message, such as the CF end message 2130 of FIG. 21. Devices in the ad-hoc wireless network may use the CTS to self message to efficiently reserve a paging interval for paging communications between network devices.

Figure 28:
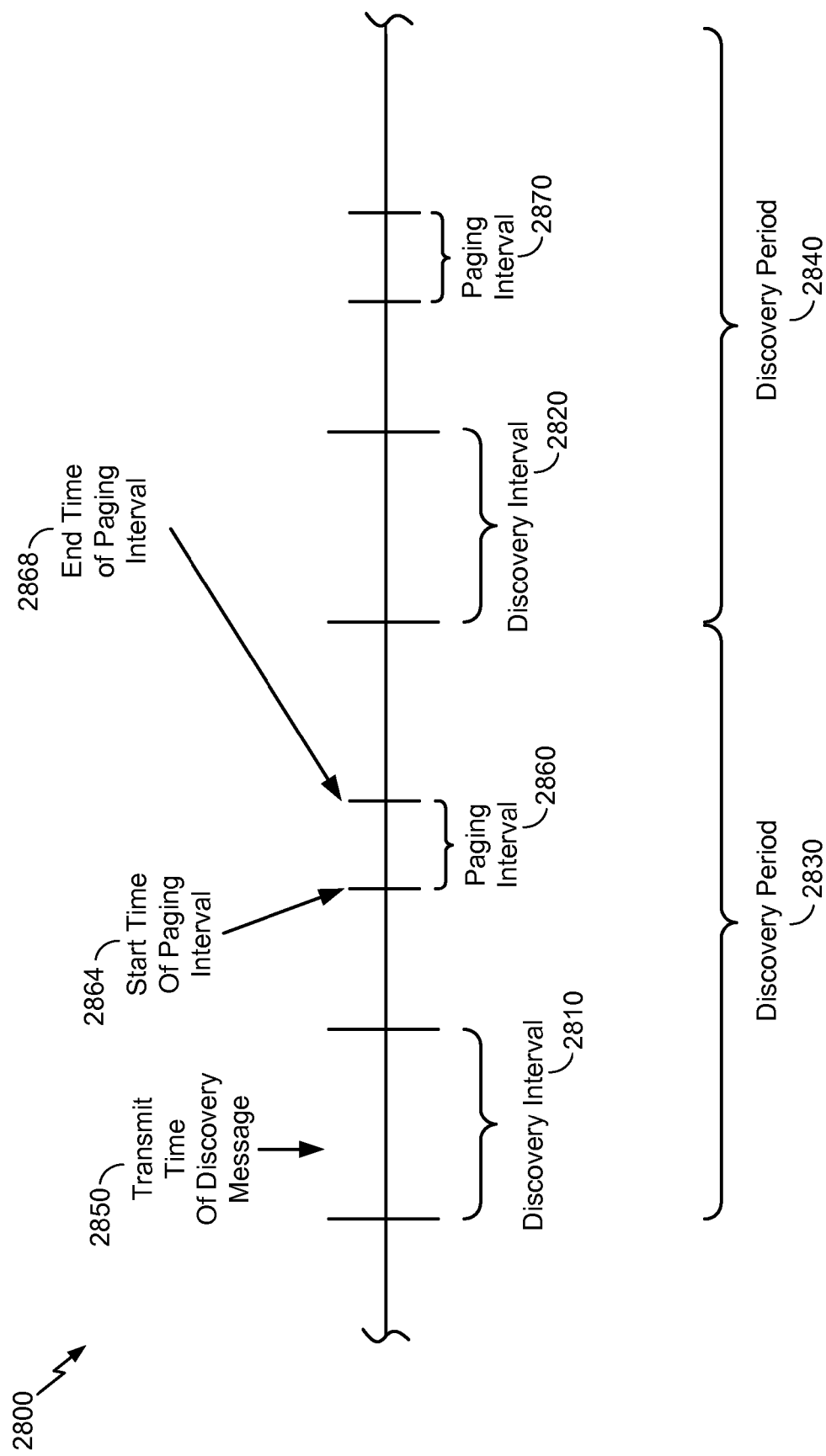
FIG. 28 depicts a timeline of successive discovery periods associated with a network, such as the network of FIG. 1.

Referring to FIG. 28, a particular illustrative embodiment of a timeline of successive discovery periods is depicted and generally designated 2800. The example timeline 2800 includes a first discovery period 2830 and a second discovery period 2840. The first discovery period 2830 includes a first discovery interval 2810 and the second discovery period 2840 includes a second discovery interval 2820. At least some features of the example timeline 2800 may be described with reference to features of FIGS. 1-27. For example, in at least one embodiment, the first discovery interval 2810, the second discovery interval 2820, the first discovery period 2830, and the second discovery period 2840 correspond to the first discovery interval 210, the second discovery interval 220, the first beacon interval 230, and the second beacon interval 240, respectively, described with reference to FIG. 2. The example timeline 2800 describes communications within a network, such as any of the networks of FIGS. 1-27, or a combination thereof.

During the first discovery interval 2810, a first device may transmit a discovery message (e.g., a beacon). The discovery message may be associated with an ad-hoc wireless network (e.g., the discovery message may "advertise" the ad-hoc wireless network to other devices). The discovery message may be transmitted at a transmit time 2850, which may be selected according to one or more of the example techniques described herein.

The discovery message may include an indication of a start time of a paging interval. For example, the discovery message may include an indication of a start time 2864 of a first paging interval 2860. As depicted in the example timeline 2800 of FIG. 28, the first paging interval 2860 may occur within the same discovery period during which the discovery message including the indication of the start time 2864 was transmitted (i.e., the first paging interval 2860 may occur within the first discovery period 2830).

In at least one embodiment, the discovery message indicates the start time 2864 as an offset (e.g., a time duration) from a time at which the discovery message is transmitted (i.e., transmit time 2850). In at least another embodiment, the discovery message indicates the start time 2864 as a time of a clock associated with the ad-hoc wireless network. For example, if devices of the ad-hoc wireless network are synchronized according to a common clock (e.g., via timestamps included in discovery messages), then the discovery message may indicate the start time 2864 as a time of the common clock.

The discovery message may include an indication of a duration of the first paging interval 2860. The duration may be defined by indicating both the start time 2864 and an end time 2868 of the first paging interval 2860 in the discovery message. Alternatively, the duration may be a default time interval (e.g., a predetermined time interval). In at least one embodiment, the duration is indicated as an offset from the start time 2864. During the first paging interval 2860, the first device may be in an awake state to receive paging messages from other devices in the ad-hoc wireless network.

During the first paging interval 2860, the first device may receive paging messages from other devices in the ad-hoc wireless network. The paging messages may request service information from the first device. For example, the paging messages may request service information that identifies a start of a service offered by a second device of the ad-hoc wireless network, details associated with services offered by the first device, or a combination thereof. One example of a service is a gaming application that enables multi-player interaction via the ad-hoc wireless network, social networking communication via the ad-hoc wireless network, and the like. The first device may reply to the paging messages with responses that include the requested service information. In at least one embodiment, the first device sends the responses during the first paging interval 2860.

The first device may determine the start time 2864 according to one or more techniques. Multiple techniques are described herein that enable selection of the start time 2864 of the first paging interval 2860 so as to reduce likelihood of the first paging interval 2860 overlapping (e.g., conflicting with) paging intervals of other devices in the ad-hoc wireless network. For example, according to a first technique, the first device determines the start time 2864 randomly or pseudo-randomly. Other devices in the ad-hoc wireless network may also determine start times of respective paging intervals randomly or pseudo-randomly, or according to other techniques.

According to a second technique, the first device identifies at least one paging interval of another device of the ad-hoc wireless network (e.g., based on a discovery message sent by the other device) and determines the first paging interval 2860 such that the first paging interval 2860 does not overlap the at least one paging interval. For example, when the first device receives a second discovery message from a third device of the ad-hoc wireless network and the second discovery message includes an indication of a second paging interval associated with the third device, the first device may determine an interval that does not overlap the second paging interval. The first device may accordingly select a start time of the interval as the start time 2864. If the first device receives multiple discovery messages indicating multiple paging intervals associated with multiple devices of the ad-hoc wireless network, the first device may select as the first paging interval 2860 an interval that overlaps the multiple paging intervals less than other intervals. For example, continuing with the foregoing illustration, if the first device further receives a third discovery message from a fourth device of the ad-hoc wireless network and the third discovery message includes an indication of a third paging interval associated with the fourth device, the first device may determine a first interval that overlaps the second paging interval and the third paging interval less than at least another paging interval overlap (e.g., less than a second interval overlaps the second paging interval and the third paging interval). The first device may accordingly select the first interval as the first paging interval 2860 (e.g., by selecting a start time of the first interval as the start time 2864).

According to a third technique, the first device determines the start time 2864 based on an identifier associated with the first device. The identifier may be unique to the first device. The first device may perform an operation based on the unique identifier to generate the start time 2864. For example, the first device may determine the start time 2864 by performing a hash operation on a media access control (MAC) address associated with the first device (e.g., the MAC address 835 of FIG. 8) to generate the start time. Because each device in the ad-hoc wireless network may be associated with a unique MAC address, basing the start time 2864 on the MAC address associated with the first device may reduce likelihood of the first paging interval 2860 overlapping other paging intervals of other devices in the ad-hoc wireless network.

By operating an ad-hoc wireless network in accordance with the example timeline 2800 of FIG. 28, devices in the ad-hoc wireless network may select respective paging intervals, while still reducing the likelihood of collisions between paging messages. Operation of a network (e.g., the network 140) according to the example timeline 2800 of FIG. 28 may be particularly advantageous where the ad-hoc wireless network includes a large number of devices, since the likelihood of collisions increases in such networks. Further, each device may operate according to a low power state when not sending or receiving paging messages, as described further below.

Figure 29:
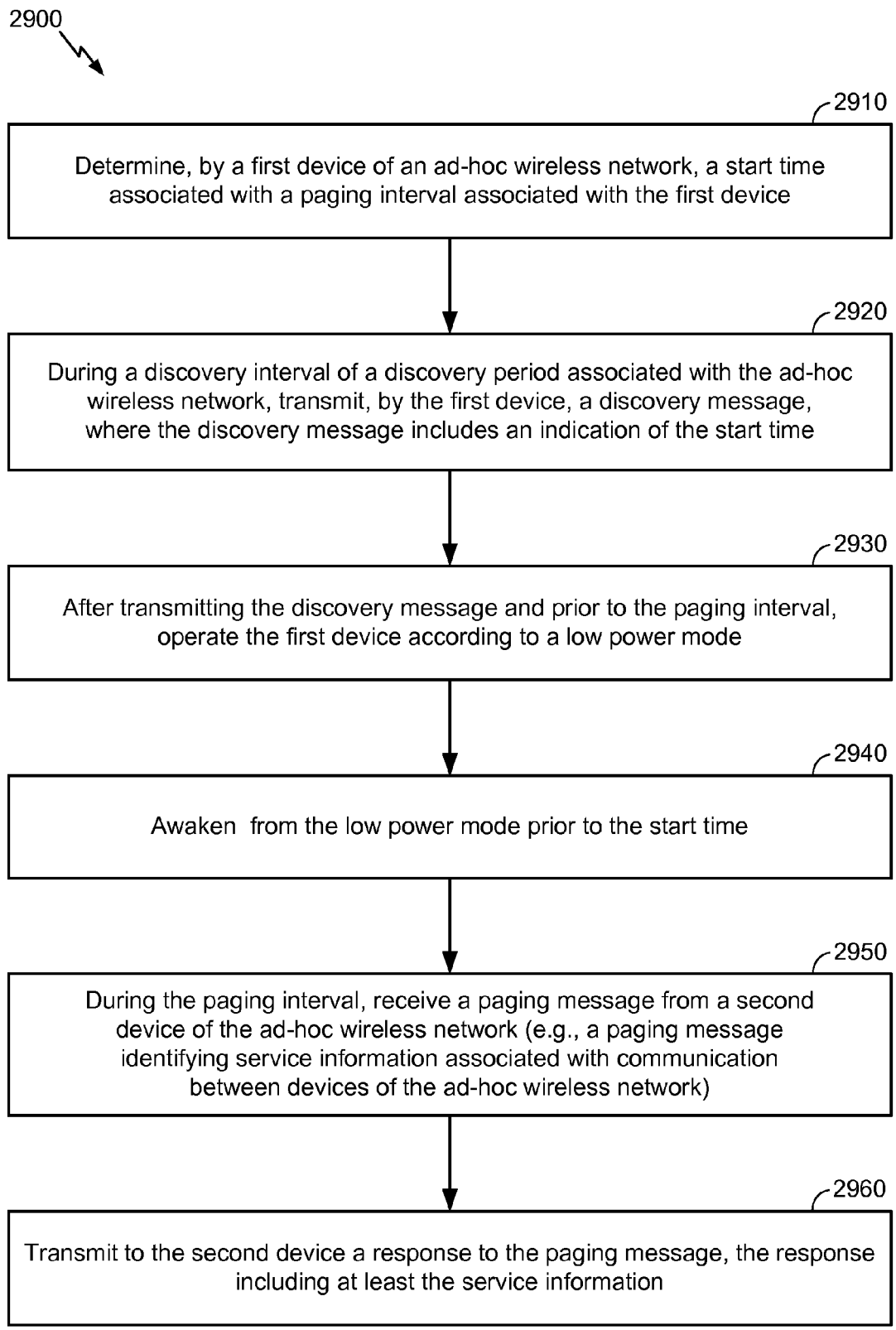
FIG. 29 depicts a flow chart of a particular embodiment of a method of operation of a device, such as one of the devices of FIG. 1.

FIG. 29 depicts a flow chart of a particular embodiment of a method 2900 of operation of a device, such as the first device 110 of FIG. 1, the second device 120 of FIG. 1, the third device 130 of FIG. 1, or a combination thereof. The method 2900 may be performed within a network, such as the network 140 of FIG. 1.

At 2910, the method 2900 includes determining, by a first device of an ad-hoc wireless network, a start time associated with a paging interval associated with the first device. The first device may be the first device described with reference to the example timeline 2800 of FIG. 28. The start time and the paging interval may be the start time 2864 and the first paging interval 2860, respectively, described with reference to FIG. 28. The start time may be determined according to one or more techniques described with reference to FIG. 28.

At 2920, during a discovery interval of a discovery period associated with the ad-hoc wireless network, the first device transmits a discovery message, where the discovery message includes an indication of the start time. The discovery message may further include a duration of the paging interval.

According to a particular illustrative embodiment, after transmitting the discovery message and prior to the paging interval, the first device operates according to a low power mode, at 2930. The method 2900 may further include awakening from the low power mode prior to the start time, at 2940.

During the paging interval, the first device receives a paging message from a second device of the ad-hoc wireless network, at 2950. In at least one embodiment, the paging message identifies service information associated with communication between devices of the ad-hoc wireless network. At 2960, the first device transmits to the second device a response to the paging message. The response includes at least the service information.

By operating according to the method 2900 of FIG. 29, devices in an ad-hoc wireless network may conserve power. For example, by determining the start time of the paging interval and indicating the start time in the discovery message, an advertising device (e.g., the first device) may operate according to the low power mode prior to the start time, thus conserving battery life.

Figure 30:
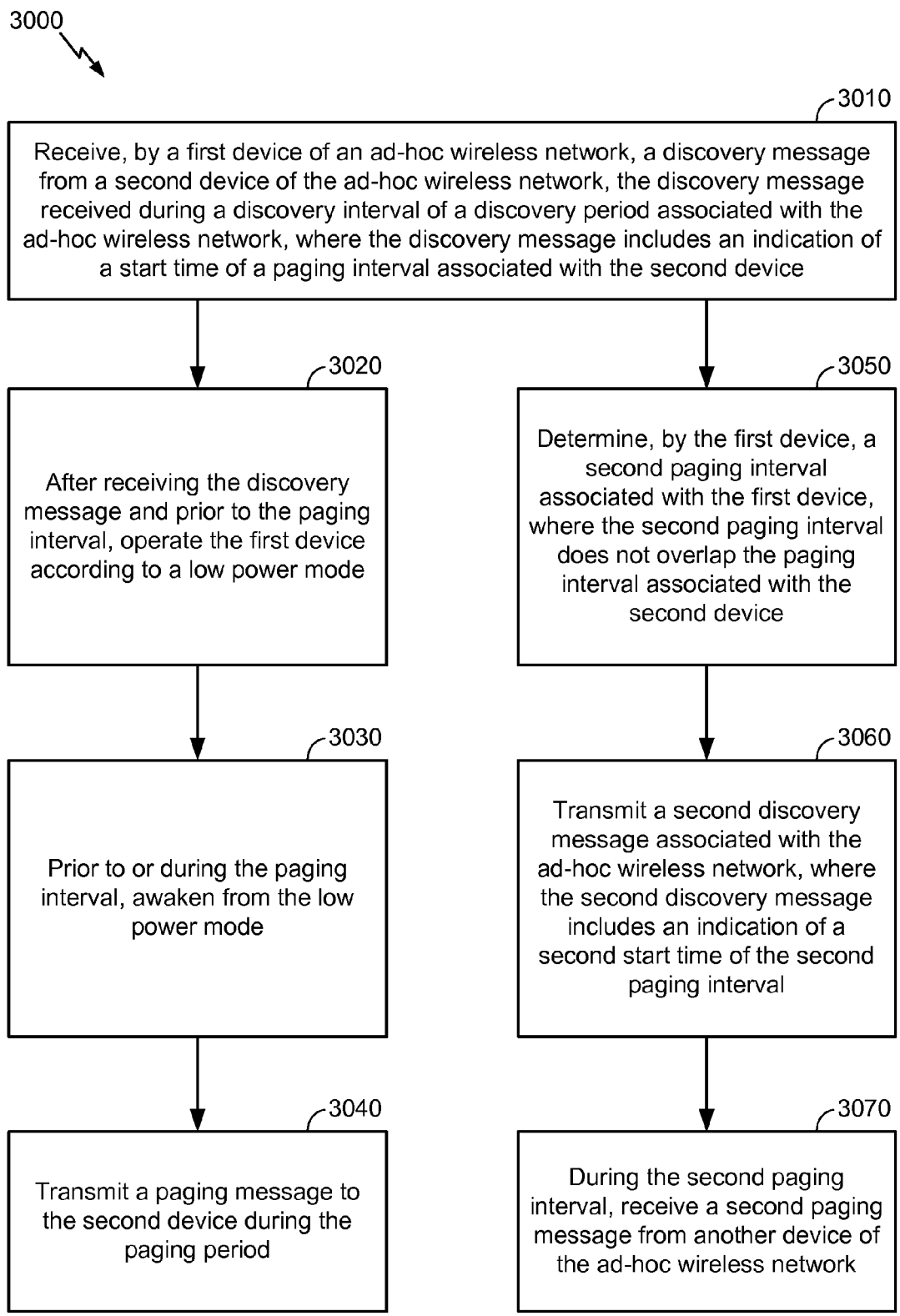
FIG. 30 depicts a timeline of successive discovery periods associated with a network, such as the network of FIG. 1.

FIG. 30 depicts a flow chart of a particular embodiment of a method 3000 of operation of a device, such as the first device 110 of FIG. 1, the second device 120 of FIG. 1, the third device 130 of FIG. 1, or a combination thereof. The method 3000 may be performed within a network, such as the network 140 of FIG. 1.

At 3010, a first device of an ad-hoc wireless network receives a discovery message from a second device of the ad-hoc wireless network. The discovery message is received during a discovery interval of a discovery period associated with the ad-hoc wireless network and includes an indication of a start time of a paging interval associated with the second device. The start time and the paging interval may be the start time 2864 and the first paging interval 2860, respectively, described with reference to FIG. 28, the start time and the paging interval described with reference to FIG. 27, respectively, or a combination thereof.

In at least one embodiment, after receiving the discovery message and prior to the paging interval, the first device operates according to a low power mode, at 3020. The first device may awaken from the lower power mode prior to or during the paging interval, at 3030. At 3040, the method 3000 includes transmitting a paging message to the second device during the paging interval. The paging message may be the paging message described with reference to FIG. 28, the paging message described with reference to FIG. 29, or a combination thereof.

The first device may also send a second discovery message that includes an indication of a start time of a second paging interval associated with the first device. For example, the first device may determine, at 3050, a second paging interval associated with the first device. The first device may select the second paging interval such that the second paging interval does not overlap the paging interval associated with the second device. At 3060, the first device may transmit the second discovery message associated with the ad-hoc wireless network. The second discovery message includes an indication of a second start time of the second paging interval. During the second paging interval, the first device may receive a second paging message from another device of the ad-hoc wireless network, at 3070.

By operating according to the method 3000 of FIG. 30, devices in an ad-hoc wireless network may conserve power. For example, because the discovery message indicates the start time of the paging interval associated with the second device, a searching device (e.g., the first device) may operate according to the low power mode prior to the start time, thus conserving battery life.

In addition, operating according to the method 3000 of FIG. 30 may enable fewer instances or reduced likelihood of devices scheduling overlapping paging intervals, potentially reducing instances of collisions between paging messages and/or responses. For example, by selecting the second paging interval such that the second paging interval does not overlap the paging interval associated with the second device, the first device reduces likelihood of collision between paging messages and/or responses.

Figure 31:
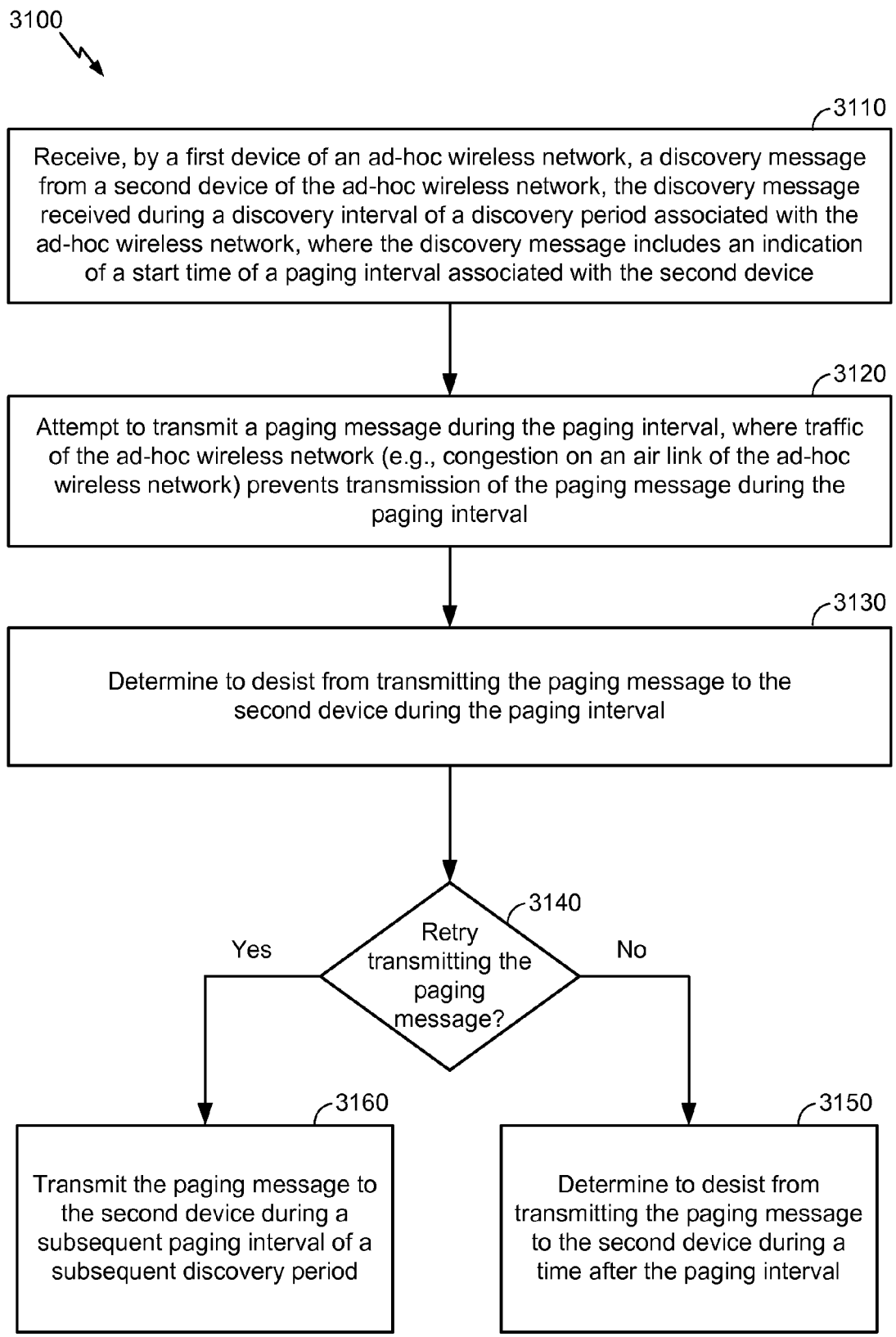
FIG. 31 depicts a timeline of successive discovery periods associated with a network, such as the network of FIG. 1.

FIG. 31 depicts a flow chart of a particular embodiment of a method 3100 of operation of a device, such as the first device 110 of FIG. 1, the second device 120 of FIG. 1, the third device 130 of FIG. 1, or a combination thereof. The method 3100 may be performed within a network, such as the network 140 of FIG. 1.

The method 3100 includes receiving, by a first device of an ad-hoc wireless network, a discovery message from a second device of the ad-hoc wireless network, at 3110. The discovery message is received during a discovery interval of a discovery period associated with the ad-hoc wireless network and includes an indication of a start time of a paging interval associated with the second device. The start time and the paging interval may be the start time 2864 and the first paging interval 2860, respectively, described with reference to FIG. 28, the start time and the paging interval described with reference to FIG. 29, respectively, the start time and the paging interval described with reference to FIG. 30, or a combination thereof.

The first device may attempt to transmit a paging message during the paging interval, at 3120. However, in the example operation of FIG. 31, traffic of the ad-hoc wireless network (e.g., congestion on an air link of the ad-hoc wireless network) prevents transmission of the paging message during the paging interval. For example, paging communications between other devices of the ad-hoc wireless network may prevent the first device from transmitting the paging message during the paging interval.

Accordingly, the first device may determine to desist from transmitting the paging message to the second device during the paging interval, at 3130. At 3140, a determination is made whether to retry transmitting the paging message. If the first device determines at 3140 that traffic of the ad-hoc wireless network is such that the paging message should not be transmitted to the second device, then the first device may determine to desist from transmitting the paging message to the second device during a time after the paging interval (e.g., during subsequent paging intervals), at 3150.

If the first device determines, at 3140, that traffic of the ad-hoc wireless network is such that the paging message may be transmitted to the second device, then the first device may transmit the paging message to the second device during a subsequent paging interval of a subsequent discovery period, at 3160. In at least one embodiment, the subsequent paging interval is advertised by the second device in a subsequent discovery message sent during a subsequent discovery interval of the subsequent discovery period. In at least another embodiment, the paging interval may reoccur periodically within subsequent discovery periods and need not be advertised again. By delaying transmission of the paging message until the subsequent paging interval, collisions between the paging message and other communications of the ad-hoc wireless network can be reduced or avoided.

Those of skill would further appreciate that the various illustrative logical blocks, configurations, modules, circuits, and method steps described in connection with the embodiments disclosed herein may be implemented as electronic hardware, instructions stored on a tangible computer readable medium and to be executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of various methods or processes described in connection with the embodiments disclosed herein may be embodied directly in hardware, in instructions executed by a processor, or in a combination of the two. Instructions to be executed by a processor may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
    prior to a particular discovery interval, receiving by a first device in an ad-hoc wireless network discovery messages from respective devices of the ad-hoc wireless network, the discovery messages including information identifying the respective devices;
    caching the information identifying the respective devices; and
    during the particular discovery interval, sending a first discovery message that includes the information identifying the respective devices and a bit indicating that the first device has cached the information identifying the respective devices.

2. The method of claim 1, further comprising deleting at least a portion of the cached information in response to not detecting within a particular time interval any paging messages from a device associated with the information, in response to not detecting any packet from the device associated with the information, according to a cache eviction or memory replacement policy, or a combination thereof.

3. A method comprising:
    prior to a particular discovery interval, sending a first discovery message by a first device of an ad-hoc wireless network, the first discovery message including information identifying the first device;
    during the particular discovery interval, receiving from a second device of the ad-hoc wireless network a second discovery message that includes the information identifying the first device, information identifying a third device of the ad-hoc wireless network, and a bit indicating that the second device has cached the information identifying the first device; and
    sending, by the first device, a request for information regarding the third device.

4. The method of claim 3, wherein the first device sends the request to the second device.

5. The method of claim 4, further comprising receiving the information regarding the third device from the second device.

6. The method of claim 3, wherein the first device sends the request to the third device.

7. The method of claim 6, further comprising receiving the information regarding the third device from the third device.

8. An apparatus comprising:
    a processor; and
    a memory storing instructions that are executable by the processor to cause the processor to:
        prior to a particular discovery interval, receive by a first device in an ad-hoc wireless network discovery messages from respective devices of the ad-hoc wireless network, the discovery messages including information identifying the respective devices;

cache the information identifying the respective devices; and during the particular discovery interval, send a first discovery message that includes the information identifying the respective devices and a bit indicating that the first device has cached the information identifying the respective devices.

9. An apparatus comprising:

a processor; and a memory storing instructions that are executable by the processor to cause the processor to:

prior to a particular discovery interval, send a first discovery message by a first device of an ad-hoc wireless network, the first discovery message including information identifying the first device;

during the particular discovery interval, receive from a second device of the ad-hoc wireless network a second discovery message that includes the information identifying the first device, information identifying a third device of the ad-hoc wireless network, and a bit indicating that the second device has cached the information identifying the first device; and send, by the first device, a request for information regarding the third device.

10. The apparatus of claim 9, wherein the request is sent to the second device.

11. The apparatus of claim 10, wherein the instructions are further executable by the processor to receive the information regarding the third device from the second device.

12. A non-transitory computer-readable medium storing instructions that are executable by a processor to cause the processor to:

prior to a particular discovery interval, receive by a first device in an ad-hoc wireless network discovery messages from respective devices of the ad-hoc wireless network, the discovery messages including information identifying the respective devices;

cache the information identifying the respective devices; and during the particular discovery interval, send a first discovery message that includes the information identifying the respective devices and a bit indicating that the first device has cached the information identifying the respective devices.

13. A non-transitory computer-readable medium storing instructions that are executable by a processor to cause the processor to:

prior to a particular discovery interval, send a first discovery message by a first device of an ad-hoc wireless network, the first discovery message including information identifying the first device;

during the particular discovery interval, receive from a second device of the ad-hoc wireless network a second discovery message that includes information identifying the first device, information identifying a third device of the ad-hoc wireless network, and a bit indicating that the second device has cached the information identifying the first device; and send by the first device a request for information regarding the third device.

14. The non-transitory computer-readable medium of claim 13, wherein the first device sends the request to the third device.

15. An apparatus comprising:

means for receiving, prior to a particular discovery interval and by a first device in an ad-hoc wireless network, discovery messages from respective devices of the ad-hoc wireless network and for sending, during the particular discovery interval, a first discovery message, wherein the discovery messages include information identifying the respective devices, and wherein the first discovery message includes the information identifying the respective devices and a bit indicating that the first device has cached the information identifying the respective devices; and means for caching the information.

16. An apparatus comprising:

means for sending, prior to a particular discovery interval, a first discovery message by a first device of an ad-hoc wireless network, for receiving, during the particular discovery interval, a second discovery message from a second device of the ad-hoc wireless network, and for sending a request to obtain information resending a third device, wherein the first discovery message includes information identifying the first device, wherein the second discovery message includes the information identifying the first device, information identifying the third device of the ad-hoc wireless network, and a bit indicating that the first device has cached the information identifying the respective devices, and means for caching the information.

17. The apparatus of claim 16, wherein the second request is sent to the second device.

18. The method of claim 1, wherein the first discovery message includes a request to reserve a paging interval during the particular discovery interval.

19. The method of claim 3, wherein the second discovery message includes a second request to reserve a paging interval during the particular discovery interval.

20. The apparatus of claim 8, wherein the first discovery message includes a request to reserve a paging interval during the particular discovery interval.

21. The apparatus of claim 9, wherein the second discovery message includes a second request to reserve a paging interval during the particular discovery interval.

22. The non-transitory computer-readable medium of claim 12, wherein the first discovery message includes a request to reserve a paging interval during the particular discovery interval.

23. The non-transitory computer-readable medium of claim 13, wherein the second discovery message includes a second request to reserve a paging interval during the particular discovery interval.

24. The apparatus of claim 15, wherein the first discovery message includes a request to reserve a paging interval during the particular discovery interval.

25. The apparatus of claim 16, wherein the second discovery message includes a second request to reserve a paging interval during the particular discovery interval.

26. The method of claim 18, further comprising:

receiving a second request from a second device of the ad-hoc wireless network during the paging interval, the second request responsive to the request and requesting at least a portion of the cached information; and sending at least the portion of the cached information to the second device.

27. The method of claim 19, wherein the first device sends the request during the paging interval.

28. The non-transitory computer-readable medium of claim 23, wherein the first device sends the request during the paging interval.

* * * * *